(12) United States Patent
Van der Auwera et al.

(10) Patent No.: US 11,277,637 B2
(45) Date of Patent: Mar. 15, 2022

(54) REFERENCE SAMPLING FOR MATRIX INTRA PREDICTION MODE

(71) Applicant: QUALCOMM Incorporated, San Diego, CA (US)

(72) Inventors: Geert Van der Auwera, Del Mar, CA (US); Adarsh Krishnan Ramasubramonian, Irvine, CA (US); Thibaud Laurent Biatek, Versailles (FR); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/867,180

(22) Filed: May 5, 2020

(65) Prior Publication Data

US 2020/0359050 A1   Nov. 12, 2020

Related U.S. Application Data

(60) Provisional application No. 62/863,729, filed on Jun. 19, 2019, provisional application No. 62/853,573, filed on May 28, 2019, provisional application No. 62/845,732, filed on May 9, 2019.

(51) Int. Cl.
| | |
|---|---|
| *H04N 19/59* | (2014.01) |
| *H04N 19/51* | (2014.01) |
| *H04N 19/593* | (2014.01) |
| *H04N 19/13* | (2014.01) |
| *H04N 19/61* | (2014.01) |
| *H04N 19/124* | (2014.01) |
| *H04N 19/82* | (2014.01) |

(52) U.S. Cl.
CPC .......... *H04N 19/59* (2014.11); *H04N 19/124* (2014.11); *H04N 19/13* (2014.11); *H04N 19/51* (2014.11); *H04N 19/593* (2014.11); *H04N 19/619* (2014.11); *H04N 19/82* (2014.11)

(58) Field of Classification Search
None
See application file for complete search history.

(56) References Cited

U.S. PATENT DOCUMENTS

| | | | | |
|---|---|---|---|---|
| 2020/0322623 | A1* | 10/2020 | Chiang | H04N 19/176 |
| 2020/0344468 | A1* | 10/2020 | Lin | H04N 19/105 |
| 2020/0366895 | A1* | 11/2020 | De Luxan Hernandez | H04N 19/119 |

OTHER PUBLICATIONS

Pfaff et al., "CE3: Affine linear weighted intra prediction (CE3-4.1, CE3-4.2)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0217-v1, pp. 1-17. (Year: 2019).*

(Continued)

*Primary Examiner* — Stuart D Bennett
(74) *Attorney, Agent, or Firm* — Shumaker & Sieffert, P.A.

(57) ABSTRACT

The disclosure describes generating a prediction block for matrix intra prediction (MIP) tool. A video coder (e.g., video encode or video decoder) may generate intra prediction samples based on reference samples, where the intra prediction samples are a subsampled set of samples of the prediction block. The video coder may clip the intra prediction samples, and after clipping the intra prediction samples, generate one or more remaining samples of the prediction block.

22 Claims, 12 Drawing Sheets

(56) References Cited

OTHER PUBLICATIONS

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages. (Year: 2019).*
Bossen F., et al., "JVET Common Test Conditions and Software Reference Configurations for SDR Video", Joint Video Experts Team (JVET) of ITU-T SG 16 WP 3 and ISO/IEC14 UTC 1/5C 29/WG 11, 14th Meeting: Geneva, CH, Mar. 19-27, 2019, JVET-N1010, pp. 1-6.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001_v10, pp. 1-408.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N1001-v7, 386 Pages.
Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19-27, 2019, 374 pages.
Bross B., et al., "Versatile Video Coding (Draft 6)", Joint Video Experts Team (JVET) of ITU-T SG 16 WP 3 and ISO/IEC JTC 1/SC 29/WG 11, JVET-O2001-vE, Jul. 3-12, 2019, 455 pages.
Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 515 Pages.
Chen J., et al., "Algorithm Description for Versatile Video Coding and Test Model 5 (VTM 5)", 14th JVET Meeting Mar. 19, 2019-Mar. 27, 2019; Geneva; (The Joint Video Exploration Team of ISO/IEC JTC1/SC29/WG11 and ITU-T SG.16), No. JVET-N1002, May 21, 2019, XP030205194, Retrieved from the Internet: URL:http://phenix.int-evry.fr/jvet/doc_end_user/documents/14_Geneva/wg11/JVET-N1002-v1.zip JVET-N1002-v1.docx, 70 pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/ ,, No. JVET-A1001 Feb. 24, 2016 (Feb. 24, 2016), XP030150000, 27 pages.
Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G0001-v1.zip, p. 20, Paragraph 2.3.7—p. 23, Paragraph 2.3.7.6, p. 17, Paragraph 2.3.5—p. 18, section 2, sections 2.1.1. 2.3.1. Abstract section "2.3.6. affine motion compensation prediction" section "2.3.8. Bi-directional optical flow".
Chen Y., et al., "Description of SDR, HDR and 360 Degree Video Coding Technology Proposal by Qualcomm and Technicolor—Low and High Complexity Versions," JVET-J0021, 10th Meeting; San Diego, US, Apr. 10-20, 2018, (The Joint Video Exploration Team of ISO/IEC JTC1/SC29/WG11 and ITU-T SG.16); URL: http://phenix.int-evry.fr/jvet/, pp. 1-43.
Choi J., et al.," Non-CE3: Simplified Mode mapping in MIP," 15. JVET Meeting; Jul. 3, 2019-Jul. 12, 2019; Gothenburg; (The Joint Video Exploration Team of ISO/IEC JTC1/SC29/WG11 and ITU-TSG.16), No. JVET-O0396, Jul. 3, 2019 (Jul. 3, 2019), XP030219452, 6 pages, Retrieved from the Internet: URL: http://phenix.int-evry.fr/jvet/doc_end_user/documents/15_Gothenburg/wg11/JVET-O0396-v2.zip JVET-O0396 v2.docx [retrieved on [Jul. 3, 2019],section 2.
Helle P., et al., "Variations of the 8-bit Implementation of MIP", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0481-v3, pp. 1-8.
Huo J., et al., "Non-CE3: Removal of MIP Mapping Table", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0321-v3, pp. 1-6.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
Kondo K., et al., "Non-CE3: On Adaptive Rounding Offset of MIP", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0407-v2, pp. 1-4.
Ma T-C., et al., "CE3-Related: Simplification on MIP Look-up Table", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0598, pp. 1-3.
Nguyen T., et al., "Non-CE8: Minimum Allowed QP for Transform Skip Mode", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0405-v1, pp. 1-3.
Pfaff J., et al., " CE3: Affine Linear Weighted Intra Prediction (CE3-4.1, CE3-4.2)," 14. JVET Meeting; Mar. 19, 2019-Mar. 27, 2019, Geneva; (The Joint Video Exploration Team of ISO/IEC JTC1/SC29/WG11 and ITU-T SG.16), No. JVET-N0217, Mar. 12, 2019 (Mar. 12, 2019), XP030202699, 17 pages, Retrieved from the Internet: URL: http://phenix.int-evry.fr/jvet/doc_end_user/documents/14_Geneva/wg11/JVET-N0217-v1.zip JVET-N0217_v1.docx [retrieved on Mar. 12, 2019] cited in the application, sections 1.1-1.10.
Pfaff J., et al., "Non-CE3: Harmonization of 8-Bit MIP with Unified-MPM and LFNST", Joint Video Experts Team (JVET) of ITU-T SG 16 WP 3 and ISO/IEC JTC 1/SC 29/WG 11, JVET-O0485-V2, 15th Meeting: Gothenburg, SE, Jul. 3-12, 2019, Document: JVET-O0485-r2, pp. 1-4.
Pfaff J., et al., "Non-CE3: Simplifications of MIP", Joint Video Experts Team (JVET) of ITU-T SG 16 WP 3 and ISO/IEC JTC 1/SC 29/WG 11, JVET-O0925-v3, 15th Meeting: Gothenburg, SE, Jul. 3-12, 2019, Document: JVET-O0925-r3, pp. 1-4.
Ramasubramonian A K., et al., "Non-CE3: MIP Simplifications," 15. JVET Meeting, Jul. 3, 2019-Jul. 12, 2019, Gothenburg; (The Joint Video Exploration Team of ISO/IEC JTC1/SC29/WG11 and ITU-TSG.16), No. JVET-O0187, Jul. 4, 2019 (Jul. 4, 2019), XP030218788, 6 pages, Retrieved from the Internet: URL: http://phenix.int-evry.fr/jvet/doc_end_user/documents/15_Gothenburg/wg11/JVET-O0187-v3.zip JVET-00187-v3.docx [retrieved on Jul. 4, 2019], section 2.
Salehifar M., et al., "CE3 Related: No MPM Derivation for Matrix Based Intra Prediction (MIP)", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0169-V2, pp. 1-4.
Zhang Z., et al., "CE3-1: MIP Downsampling Process—Align Positions of Reduced Boundary Samples with Positions of Reduced Prediction Samples", Joint Video Experts Team (JVET) of ITU-T SG 16 WP 3 and ISO/IEC JTC 1/SC 29/WG 11, JVET-P0064, 16th Meeting: Geneva, CH, Oct. 1-11, 2019, Document: JVET-P0064-v1, pp. 1-6.
Zhang Z., et al., "Non-CE3: MIP Low Resolution Clipping", Joint Video Experts Team (JVET) of ITU-T SG 16 WP 3 and ISO/IEC JTC 1/SC 29/WG 11, 15th Meeting: Gothenburg, SE, Jul. 3-12, 2019, Document: JVET-O0168, pp. 1-7.
Zhang Z., et al., "Non-CE3: Sample Value Clipping on MIP Reduced Prediction", Joint Video Experts Team (JVET) of ITU-T

(56) References Cited

OTHER PUBLICATIONS

SG 16 WP 3 and ISO/IEC JTC 1/SC 29/WG 11, JVET-O0160, 15th Meeting: Gothenburg, SE, Jul. 3-12, 2019, Document: JVET-O0160, pp. 1-7.

Zhang Z., et al., "Non-CE3: Simplification on MIP Boundary Sample Downsampling Process", Joint Video Experts Team (JVET) of ITU-T SG 16 WP 3 and ISO/IEC JTC 1/SC 29/WG 11, JVET-O0161, 15th Meeting: Gothenburg, SE, Jul. 3-12, 2019, Document: JVET-O0161, pp. 1-9.

Hernández S-D., et al., "CE3: Line-based intra coding mode (Tests 2.1.1 and 2.1.2)", 12th JVET Meeting, Oct. 3, 2018-Oct. 12, 2018, Macao, CN, (The Joint Video Exploration Team of ISO/IEC JTC1/SC29/WG11 and ITU-T SG.16), No. JVET-L0076-V2, Fraunhofer HHI, pp. 1-10, Retrieved from the Internet: URL: http://phenix.int-evry.fr/jvet/doc_end_user/documents/12_Macao/wg11/JVET-L0076-v2.zip. [retrieved on Sep. 30, 2018].

International Search Report and Written Opinion—PCT/US2020/031671—ISA/EPO—dated Aug. 14, 2020 (15 pp).

\* cited by examiner

REFERENCE SAMPLING FOR MATRIX INTRA PREDICTION MODE

This application claims the benefit of U.S. Provisional Patent Application 62/845,732, filed May 9, 2019, U.S. Provisional Patent Application 62/853,573, filed May 28, 2019, and U.S. Provisional Application 62/863,729, filed Jun. 19, 2019, the entire content of each of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for affine linear weighted intra prediction (also called matrix intra prediction (MIP)). In MIP, reference samples (e.g., samples based on neighboring samples such as above and left samples) of a current block are filtered to form samples that are used to generate a prediction block. A video encoder signals residual values between the prediction block and the current block. A video decoder generates the prediction block in a similar manner as the video encoder and reconstructs the current block based on the prediction block and the received residual values.

As part of generating a prediction block in accordance with MIP, a video coder (e.g., the video encoder or the video decoder) may generate intra prediction samples based on the reference samples, where the intra prediction samples are subsampled set of samples of the prediction block (e.g., some but not all of the samples of the prediction block). The video coder may generate one or more remaining samples of the prediction block based on the intra prediction samples (e.g., such as by interpolating the intra prediction samples).

Some techniques describe clipping the samples of the prediction block after generating the one or more remaining samples. However, delaying the clipping operation until after generating the one or more remaining supplies may require additional operations that can be reduced. Without reduction of these operations, the processing time by the video encoder and video decoder may be impacted because processing time is wasted in generating the prediction block.

This disclosure describes example techniques of performing the clipping operation on the intra prediction samples (e.g., prior to generating the one or more remaining samples). The video coder may then generate the one or more remaining samples in the prediction block based on the clipped intra prediction samples. Because fewer samples need to clipped, the processing time of generating the prediction block may be reduced relative to example techniques in which clipping is performed after generating the one or more remaining samples of the prediction block. In this manner, this disclosure describes example techniques that improve the intra-prediction process, such as that of the affine linear weighted intra prediction (also called MIP), and provides a practical application of intra prediction in the technology of video coding.

In one example, the disclosure describes a method of decoding video data, the method comprising generating a prediction block for a current block, wherein generating the prediction block for the current block comprises determining intra prediction samples based on reference samples for the current block, the intra prediction samples being a subsampled set of samples of the prediction block, clipping the intra prediction samples, and after clipping the intra prediction samples, generating one or more remaining samples in the prediction block based on the clipped intra prediction samples, and reconstructing the current block based on the prediction block and residual values indicative of a difference between the prediction block and the current block.

In one example, the disclosure describes a method of encoding video data, the method comprising generating a prediction block for a current block, wherein generating the prediction block for the current block comprises determining intra prediction samples based on reference samples for the current block, the intra prediction samples being a subsampled set of samples of the prediction block, clipping the intra prediction samples, and after clipping the intra prediction samples, generating one or more remaining samples in the prediction block based on the clipped intra prediction samples, determining residual values indicative of a difference between the current block and the prediction block, and signaling information indicative of the residual values.

In one example, the disclosure describes a device for decoding video data, the device comprising a memory configured to store reference samples for a current block and processing circuitry configured to generate a prediction block for the current block, wherein to generate the prediction block for the current block, the processing circuitry is configured to determine intra prediction samples based on the reference samples stored in the memory for the current block, the intra prediction samples being a subsampled set of samples of the prediction block, clip the intra prediction samples, and after clipping the intra prediction samples, generate one or more remaining samples in the prediction block based on the clipped intra prediction samples, and reconstruct the current block based on the prediction block and residual values indicative of a difference between the prediction block and the current block.

In one example, the disclosure describes a device for encoding video data, the device comprising memory configured to store reference samples for a current block, and processing circuitry configured to generate a prediction block for the current block, wherein to generate the prediction block for the current block, the processing circuitry is configured to determine intra prediction samples based on reference samples for the current block, the intra prediction samples being a subsampled set of samples of the prediction block, clip the intra prediction samples, and after clipping the intra prediction samples, generate one or more remaining samples in the prediction block based on the clipped intra prediction samples, determine residual values indicative of a difference between the current block and the prediction block, and signal information indicative of the residual values.

In one example, the disclosure describes a device for decoding video data, the device comprising means for generating a prediction block for a current block, wherein the means for generating the prediction block for the current block comprises means for determining intra prediction samples based on reference samples for the current block, the intra prediction samples being a subsampled set of samples of the prediction block, means for clipping the intra prediction samples, and means for generating one or more remaining samples in the prediction block based on the clipped intra prediction samples after clipping the intra prediction samples, and means for reconstructing the current block based on the prediction block and residual values indicative of a difference between the prediction block and the current block.

In one example, the disclosure describes a computer-readable storage medium storing instructions thereon that when executed cause one or more processors of a device for decoding video data to generate a prediction block for a current block, wherein the instructions that cause the one or more processors to generate the prediction block for the current block comprise instructions that cause the one or more processors to determine intra prediction samples based on reference samples for the current block, the intra prediction samples being a subsampled set of samples of the prediction block, clip the intra prediction samples, and after clipping the intra prediction samples, generate one or more remaining samples in the prediction block based on the clipped intra prediction samples, and reconstruct the current block based on the prediction block and residual values indicative of a difference between the prediction block and the current block.

The details of one or more examples are set forth in the accompanying drawings and the description below. Other features, objects, and advantages will be apparent from the description, drawings, and claims.

DETAILED DESCRIPTION

Figure 1:
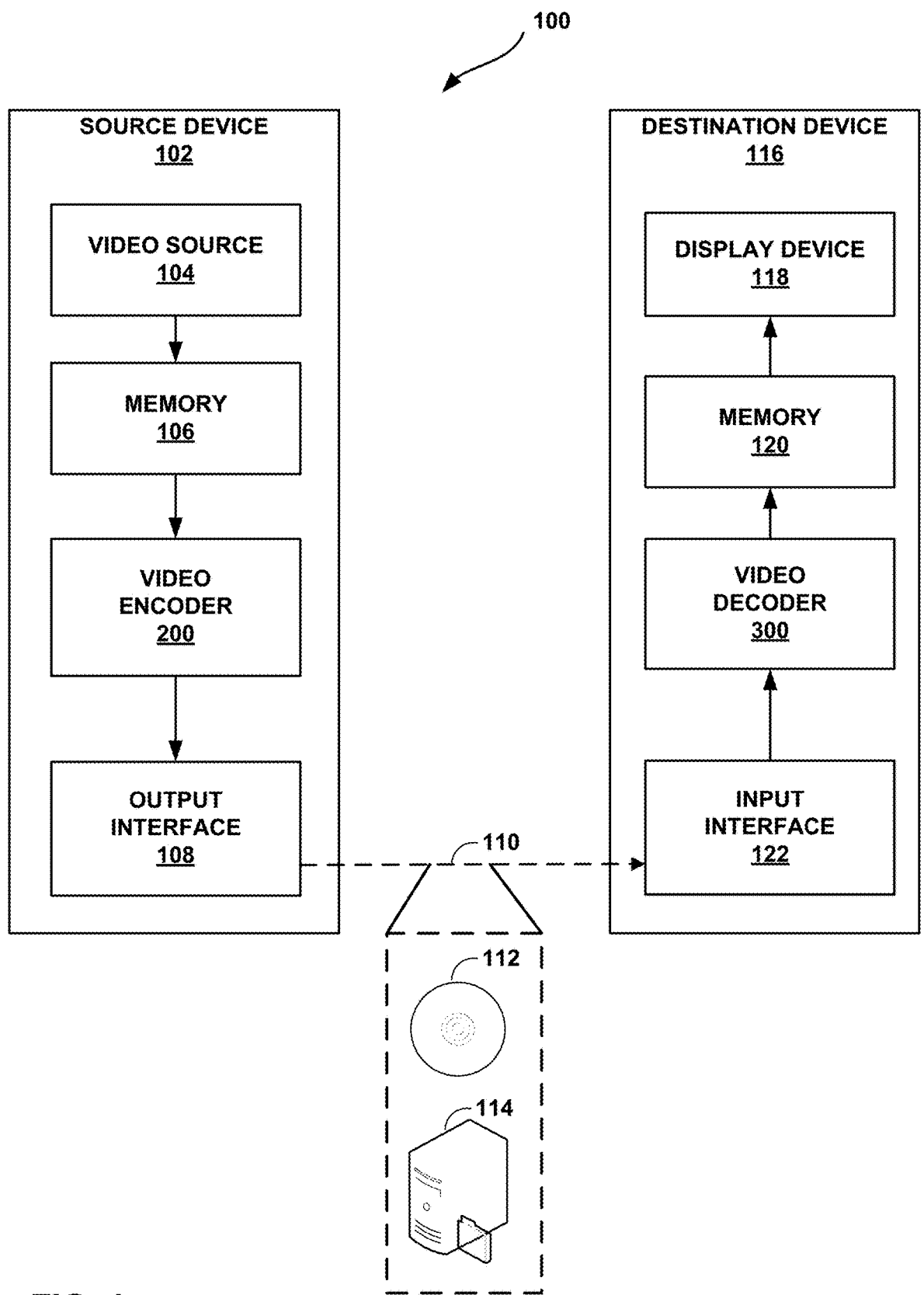
FIG. 1 is a block diagram illustrating an example video encoding and decoding system that may perform the techniques of this disclosure.

In video coding, a video encoder generates a prediction block for a current block being encoded and a residual (e.g., difference) between the prediction block and the current block. The video encoder signals information indicative of the residual to a video decoder. The video decoder generates a prediction block for the current block using the same techniques as the video encoder, and adds the residual to the prediction block to reconstruct the current block.

The video encoder and video decoder, generically referred to as a video coder, may be configured to generate a prediction block in accordance with the affine linear weighted intra prediction (ALWIP) tool, also referred to as the matrix intra prediction (MIP) tool. In accordance with MIP, the video coder may determine boundary values based on reference samples. Examples of the reference samples include neighboring samples from a column on left of the current block and neighboring samples from a row above the current block.

In some examples, the video coder may average sets of reference samples to determine the boundary values. As one example, for an 8×8 sized current block, the column on the left of the current block includes 8 reference samples. The video coder may determine sets of two samples (e.g., a first set includes the first two samples of the 8 reference samples, and a second set includes the next two samples of the 8 reference samples) and determines the average of each set of two samples to generate four boundary values from the left. The video coder may perform similar operations for the 8 reference samples in the row above the current block to generate four boundary values from above.

In some examples, the video coder may set the boundary values equal to the reference samples (e.g., without averaging). For example, for an 8×4 sized current bock, the column on left of the current block includes four reference samples. The video coder may set the four reference samples equal to four boundary values from the left. For the 8 reference samples above the current block, the video coder may perform averaging similar to the 8×8 sized current block example.

The 8×8 and 8×4 are examples of two block sizes. For different block sizes, the video coder may perform similar operations. For instance, for 4×4 sized blocks, there may be no averaging. For 16×16 sized blocks, there may be averaging of four sets of samples for the reference samples on the left and averaging of two sets of samples from above, followed by another round of averaging.

After determining the boundary values, the video coder may scale and offset, such as by performing matrix multiplication and addition, using pre-defined or signaled parameters. In some techniques, the resulting values, referred to as intra prediction samples, may form part of the prediction block. That is, if the prediction block includes a set of samples, the resulting values (e.g., intra prediction samples), in some techniques, are a subsampled set of samples of the prediction block. The video coder may then generate one or more remaining samples of the prediction block using the subsampled set (e.g., by interpolating using the subsampled set). In these techniques, the video coder may then clip the values of the prediction block so that the values of the prediction block are within a set range.

However, there may be deficiencies in some of these techniques. For example, by delaying the clipping until after generating remaining values of the prediction block, the number of samples that need clipping is increased as compared to if the video coder performed clipping prior to generating the remaining values of the prediction block. The clipping operation may utilize processing time of the video coder, which delays the generation of the prediction block, and in turn delays the encoding and reconstructing of the current block.

This disclosure describes example techniques of clipping the intra prediction samples prior to generating the remaining samples of the prediction block. For example, to generate the prediction block, the video coder may determine intra prediction samples based on reference samples for the current block, the intra prediction samples being a subsampled set of samples of the prediction block. The video coder may clip the intra prediction samples, and after clipping the intra prediction samples, generate one or more remaining samples in the prediction block based on the clipped intra prediction samples. In such techniques, because the clipping is performed on the intra prediction samples prior to generating the one or more remaining samples of the prediction block, the number of clipping operations that would need to be performed on the prediction block may be reduced, which reduces processing time and improves the operation of the video coder.

FIG. 1 is a block diagram illustrating an example video encoding and decoding system 100 that may perform the techniques of this disclosure, including the techniques for performing reference sampling for matrix intra prediction mode described herein. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for affine linear weighted intra prediction (also called matrix intra prediction (MIP)). Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for affine linear weighted intra prediction (e.g., matrix intra prediction (MIP)). Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 includes video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v5 (hereinafter "VVC Draft 5"). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, nonoverlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Another example of intra-prediction is affine linear weighted intra prediction (ALWIP), also called matrix intra prediction (MIP). Examples of the MIP mode are described in more detail below. In general, in MIP, video encoder 200 generates some of the samples of a prediction block based on boundary values that are generated from reference samples (e.g., neighboring samples). Video encoder 200 generates one or more of the remaining samples of the prediction block based on the samples generated from the boundary values. Video decoder 300 performs similar operations to generate the prediction block for MIP.

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU.

The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a video coder (e.g., video encoder 200 or video decoder 300) may be configured to generate a prediction block for a current block based on matrix intra prediction mode in accordance with any one or combination of the techniques described in this disclosure and code the current block based on the prediction block. Examples of matrix intra prediction mode (MIP), also called affine linear weighted intra prediction (ALWIP), are described in more detail below. As one example, video encoder 200 may generate a prediction block using MIP, as described in this disclosure, and determine residual values between the prediction block and the current block, and signal values indicative of the residual values. Video decoder 300 may receive the values indicative of the residual values and generate a prediction block using MIP, as described in this disclosure. Video decoder 300 may reconstruct the current block based on the residual values and the prediction block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
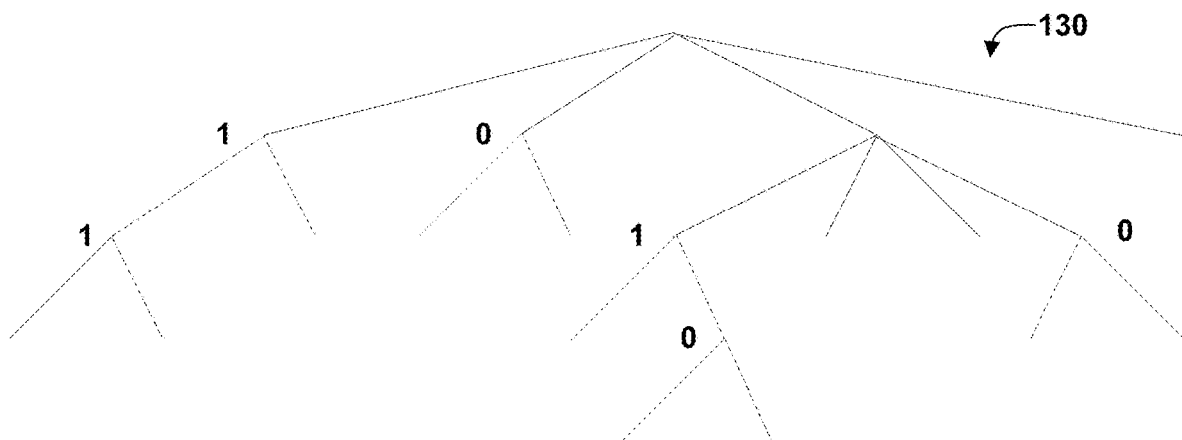
FIGS. 2A and 2B are conceptual diagrams illustrating an example quadtree binary tree (QTBT) structure, and a corresponding coding tree unit (CTU).
Figure 2B:
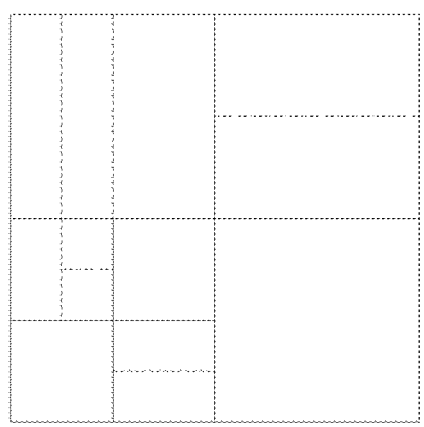

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

During the $14^{th}$ JVET meeting in Geneva, Switzerland, the "Affine linear weighted intra prediction" or "ALWIP" tool described in J. Pfaff, B. Stallenberger, M. Schafer, P. Merkle, P. Helle, T. Hinz, H. Schwarz, D. Marpe, T. Wiegand, "CE3: Affine linear weighted intra prediction," $14^{th}$ JVET Meeting, Geneva, Switzerland, March 2019, JVET-N0217 (hereinafter JVET-N0217) was adopted into the VVC working draft version 5. The ALWIP tool is also referenced with the name "matrix intra prediction" or "MIP". As an introduction to this tool, descriptions from JVET-N0217 are reproduced in the following description.

These references may also provide information related to video coding: M. Karczewicz et al., "Description of SDR, HDR and 360° video coding technology proposal by Qualcomm," 10$^{th}$ JVET Meeting, San Diego, Calif., USA, April 2018, JVET-J0021, J. Chen, E. Alshina, G. J. Sullivan, J.-R. Ohm, J. Boyce, "Algorithm description of Joint Exploration Test Model 7," 7th JVET Meeting, Torino, Italy, July 2017, WET-G1001, and J. Chen, Y. Ye, S. Kim, "Algorithm description for Versatile Video Coding and Test Model 5 (VTMS)," 14$^{th}$ JVET Meeting, Geneva, Switzerland, March 2019, JVET-N1002.

The following is the description of the ALWIP method from JVET-N0217. For predicting the samples of a rectangular block of width W and height H, ALWIP takes one line of H reconstructed neighboring boundary samples left of the block and one line of W reconstructed neighboring boundary samples above the block as input. If the reconstructed samples are unavailable, then samples are generated using the conventional intra prediction (see description below for VVC reference sample substitution process). The neighboring boundary samples may be examples of reference samples used for MIP.

The generation of the prediction signal is based on the following steps:
1. Video encoder 200 and video decoder 300 may determine, by averaging from the boundary samples (e.g., reference samples, which may be neighboring samples), four samples (referred to as boundary values) in the case of W=H=4 and eight samples (referred to as boundary values) in all other cases.
2. Video encoder 200 and video decoder 300 may perform a matrix vector multiplication, followed by addition of an offset, with the averaged samples as an input. The result is a reduced prediction signal of a subsampled set of samples in the prediction block. Stated another way, video encoder 200 and video decoder 300 may perform the matrix vector multiplication and addition of the offset to determine intra prediction samples based on reference samples for the current block, the intra prediction samples being a subsampled set of samples of the prediction block (e.g., some but not all of the samples of the prediction block).
3. The prediction signal at the remaining positions is generated from the prediction signal on the subsampled set by linear interpolation which is a single step linear interpolation in each direction. For example, video encoder 200 and video decoder 300 may generate one or more remaining samples in the prediction block based on the intra prediction samples.
4. In some cases, matrix vector multiplication may lead to out-of-range values. Accordingly, video encoder 200 and video decoder 300 may perform a clipping operation on the full-resolution prediction signal (e.g., on the samples in the prediction block).

In the above example, the clipping operation is performed after generating the one or more remaining samples. In such cases, there is a chance that the number of samples that need clipping is greater than desired, which negatively impacts processing time. In accordance with one or more example techniques, video encoder 200 and video decoder 300 may perform clipping on the intra prediction samples (i.e., the subsampled set of samples of the prediction block), and after clipping the intra prediction samples, generate the one or more remaining samples in the prediction block based on the clipped intra prediction samples. In this manner, video encoder 200 and video decoder 300 may generate the prediction block for the current block using MIP. Because the clipping is performed before generating the one or more remaining samples, the number of samples of a prediction block that need clipping may be reduced relative to the number of samples that need clipping if clipping is performed after generating the one or more remaining samples.

The matrices and offset vectors needed to generate the prediction signal are taken from three sets $S_0$, $S_1$, $S_2$ of matrices. The set $S_0$ consists of 18 matrices $A_0^i$, $i \in \{0, \ldots, 17\}$ each of which has 16 rows and 4 columns and 18 offset vectors $b_0^i$, $i \in \{0, \ldots, 17\}$ each of size 16. Matrices and offset vectors of that set are used for blocks of size 4×4. The set $S_1$ consists of 10 matrices $A_1^i$, $i \in \{0, \ldots, 9\}$, each of which has 16 rows and 8 columns and 10 offset vectors $b_1^i$, $i \in \{0, \ldots, 9\}$ each of size 16. Matrices and offset vectors of that set are used for blocks of sizes 4×8, 8×4 and 8×8. The set $S_2$ consists of 6 matrices $A_2^i$, $i \in \{0, \ldots, 5\}$, each of which has 64 rows and 8 columns and of 6 offset vectors $b_2^i$, $i \in \{0, \ldots, 5\}$ of size 64. Matrices and offset vectors of that set (i.e., $S_0$, $S_1$, $S_2$ of matrices) or parts of these matrices and offset vectors are used for all other block-shapes. The above examples of matrices should not be considered as limiting, and the techniques may be applicable to various matrices.

The total number of multiplications needed in the computation of the matrix vector product is always smaller than or equal to 4·W·H. In other words, at most four multiplications per sample are required for the ALWIP (i.e., MIP) modes.

The following describes averaging of the boundary of ALWIP (also called MIP). In a first step, the input boundaries bdry$^{top}$ and bdry$^{left}$ are reduced to smaller boundaries bdry$_{red}^{top}$ and bdry$_{red}^{left}$. Here, bdry$_{red}^{top}$ and bdry$_{red}^{left}$ both consist of 2 samples in the case of a 4×4 block and both consist of 4 samples in all other cases.

In this disclosure, bdry$^{top}$ and bdry$^{left}$ are examples of reference samples (e.g., samples neighboring the current block), and bdry$_{red}^{top}$ and bdry$_{red}^{left}$ are examples of boundary values. For example, as described below, video encoder 200 and video decoder 300 may determine bdry$_{red}^{top}$ and bdry$_{red}^{left}$ (e.g., boundary values) based on sets of the reference samples for the current block (e.g., bdry$^{top}$ and bdry$^{left}$). The boundary values may be equal to the reference samples or averages of sets of the reference samples.

In the case of a 4×4-block, for $0 \leq i < 2$, the following equation defines $$bdry_{red}^{top}[i] = \left(\left(\sum_{j=0}^{1} bdry^{top}[i \cdot 2 + j]\right) + 1\right) \gg 1$$

and defines bdry$_{red}^{left}$ analogously.

Otherwise, if the block-width W is given as $W=4 \cdot 2^k$, for $0 \leq i < 4$, the following equation defines:

$$bdry_{red}^{top}[i] = \left(\left(\sum_{j=0}^{2^k-1} bdry^{top}[i \cdot 2^k + j]\right) + (1 \ll (k-1))\right) \gg k$$

and defines bdry$_{red}^{left}$ analogously.

The two reduced boundaries bdry$_{red}^{top}$ and bdry$_{red}^{left}$ are concatenated to a reduced boundary vector bdry$_{red}$ which is thus of size four for blocks of shape 4×4 and of size eight for blocks of all other shapes. If mode refers to the ALWIP-mode, this concatenation is defined as follows:

$$bdry_{red} = \begin{cases} [bdry_{red}^{top}, bdry_{red}^{left}] & \text{for } W = H = 4 \text{ and mode} < 18 \\ [bdry_{red}^{left}, bdry_{red}^{top}] & \text{for } W = H = 4 \text{ and mode} \geq 18 \\ [bdry_{red}^{top}, bdry_{red}^{left}] & \text{for } \max(W, H) = 8 \text{ and mode} < 10 \\ [bdry_{red}^{left}, bdry_{red}^{top}] & \text{for } \max(W, H) = 8 \text{ and mode} \geq 10 \\ [bdry_{red}^{top}, bdry_{red}^{left}] & \text{for } \max(W, H) > 8 \text{ and mode} < 6 \\ [bdry_{red}^{left}, bdry_{red}^{top}] & \text{for } \max(W, H) > 8 \text{ and mode} \geq 6. \end{cases}$$

Accordingly, in one or more examples, $bdry_{red}$ may be considered as examples of boundary values that video encoder 200 and video decoder 300 determine based on sets of the reference samples for the current block. The boundary values may be equal to the reference samples or averages of sets of the reference samples, where the reference samples are neighboring samples (e.g., reference samples in a column left of the current block and reference samples in a row above the current block).

For the interpolation of the subsampled prediction signal, on large blocks a second version of the averaged boundary is needed. For example, if $\min(W, H) > 8$ and $W \geq H$, then $W = 8 \cdot 2^l$, and, for $0 \leq i < 8$, and the following equation defines:

$$bdry_{redII}^{top}[i] = \left( \left( \sum_{j=0}^{2^l - 1} bdry^{top}[i \cdot 2^l + j] \right) + (1 \ll (l-1)) \right) \gg l.$$

If $\min(W, H) > 8$ and $H > W$, $bdry_{redII}^{left}$ is defined analogously.

The following describes generating of the reduced predictions signal by matrix vector multiplication. Video encoder 200 and video decoder 300 may generate a reduced prediction signal $pred_{red}$ from the reduced input vector $bdry_{red}$. The latter signal is a signal on the downsampled block of width $W_{red}$ and height $H_{red}$. Here, $W_{red}$ and $H_{red}$ are defined as:

$$W_{red} = \begin{cases} 4 & \text{for } \max(W, H) \leq 8 \\ \min(W, 8) & \text{for } \max(W, H) > 8 \end{cases}$$

$$H_{red} = \begin{cases} 4 & \text{for } \max(W, H) \leq 8 \\ \min(W, 8) & \text{for } \max(W, H) > 8 \end{cases}$$

The reduced prediction signal $pred_{red}$ is computed by calculating a matrix vector product and adding an offset:

$$pred_{red} = A \cdot bdry_{red} + b.$$

Here, A is a matrix that has $W_{red} \cdot H_{red}$ rows and 4 columns if $W = H = 4$ and 8 columns in all other cases. b is a vector of size $W_{red} \cdot H_{red}$.

The matrix A and the vector b are taken from one of the sets $S_0, S_1, S_2$ as follows. An index $idx = idx(W, H)$ is defined as follows:

$$idx(W, H) = \begin{cases} 0 & \text{for } W = H = 4 \\ 1 & \text{for } \max(W, H) = 8 \\ 2 & \text{for } \max(W, H) > 8. \end{cases}$$

Moreover, m is defined as follows:

$$m = \begin{cases} \text{mode} & \text{for } W = H = 4 \text{ and mode} < 18 \\ \text{mode} - 17 & \text{for } W = H = 4 \text{ and mode} \geq 18 \\ \text{mode} & \text{for } \max(W, H) = 8 \text{ and mode} < 10 \\ \text{mode} - 9 & \text{for } \max(W, H) = 8 \text{ and mode} \geq 10 \\ \text{mode} & \text{for } \max(W, H) > 8 \text{ and mode} < 6 \\ \text{mode} - 5 & \text{for } \max(W, H) > 8 \text{ and mode} \geq 6. \end{cases}$$

Then, if $idx \leq 1$ or $idx = 2$ and $\min(W, H) > 4$, $A = A_{idx}^m$ and $b = b_{idx}^m$. In the case that $idx = 2$ and $\min(W, H) = 4$, A may be the matrix that arises by leaving out every row of $A_{idx}^m$ that, in the case $W = 4$, corresponds to an odd x-coordinate in the downsampled block, or, in the case $H = 4$, corresponds to an odd y-coordinate in the downsampled block.

The reduced prediction signal may be replaced by its transpose in the following cases:
$W = H = 4$ and mode $\geq 18$
$\max(W, H) = 8$ and mode $\geq 10$
$\max(W, H) > 8$ and mode $\geq 6$ The number of multiplications required for calculation of $pred_{red}$ is 4 in the case of $W = H = 4$ since in this case A has 4 columns and 16 rows. In all other cases, A has 8 columns and $W_{red} \cdot H_{red}$ rows and in these cases $8 \cdot W_{red} \cdot H_{red} \leq 4 \cdot W \cdot H$ multiplications are required, i.e., also in these cases, at most 4 multiplications per sample are needed to compute $pred_{red}$.

In one or more examples, $pred_{red}$ may be intra prediction samples that are determined based on reference samples for the current bock, the intra prediction samples being a subsampled set of samples of the prediction block. For example, video encoder 200 and video decoder 300 may determine boundary values (e.g., $bdry_{red}$) based on sets of the reference samples for the current block, where the boundary values are equal to the reference samples or averages of sets of the reference samples. Video encoder 200 and video decoder 300 may perform a matrix multiplication on the boundary values to generate first matrix-based intra prediction samples (e.g., first matrix-based intra prediction samples are the result of $A \cdot bdry_{red}$).

Video encoder 200 and video decoder 300 may apply an offset (e.g., b), to the first matrix-based intra prediction samples values to generate second matrix-based intra prediction samples (e.g., second matrix-based intra prediction samples are the result of $A \cdot bdry_{red} + b$). The intra prediction samples (e.g., $pred_{red}$) are the second matrix-based intra prediction samples (e.g., result of $A \cdot bdry_{red} + b$). Accordingly, the intra prediction samples being the subsampled set of the samples of the prediction block may refer to the second matrix-based intra prediction samples (e.g., $pred_{red}$) being the subsampled set of samples in the prediction block.

The following provides some illustrative examples of the entire ALWIP (i.e., MIP) process. The entire process of averaging, matrix vector multiplication and linear interpolation is illustrated for different shapes in FIGS. 5-8. In some examples, video encoder 200 and video decoder 300 may treat the remaining shapes as one of the example cases illustrated in FIGS. 5-8.

Figure 5:
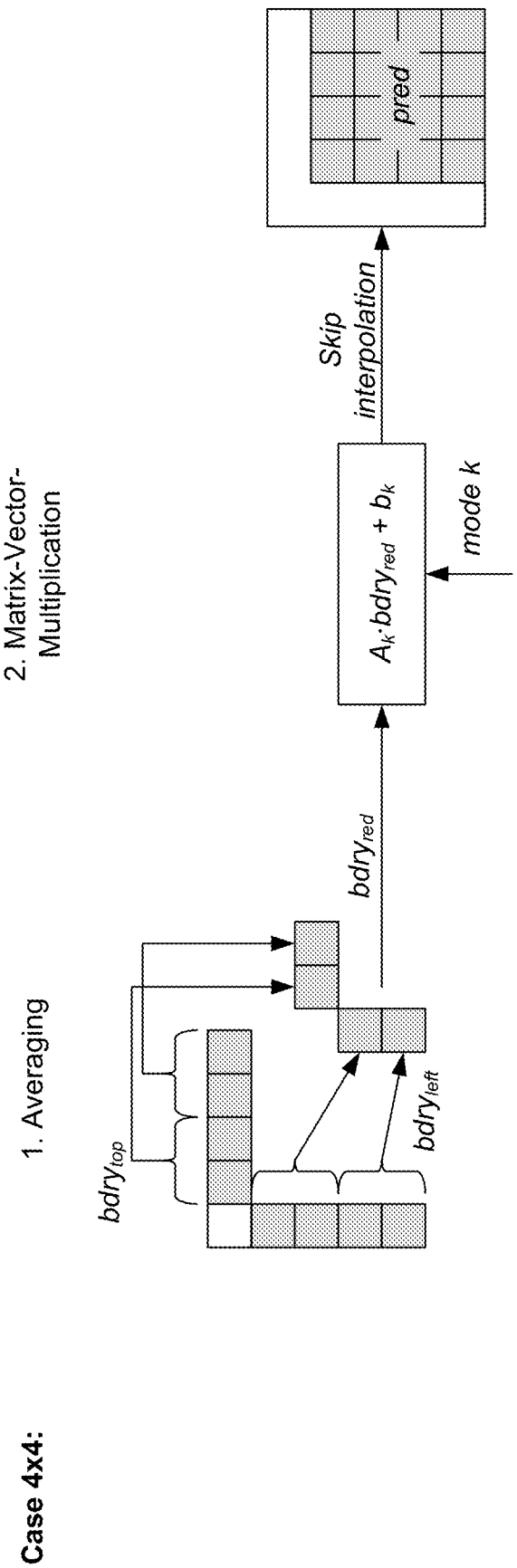
FIG. 5 is a flow diagram illustrating matrix intra prediction mode for 4×4 block.

FIG. 5 is a flow diagram illustrating matrix intra prediction mode for 4×4 block. Given a 4×4 block, ALWIP takes two averages along each axis of the boundary. The resulting four input samples enter the matrix vector multiplication. The matrices are taken from the set $S_0$. After adding an offset, this yields the 16 final prediction samples. Linear interpolation is not necessary for generating the prediction signal. Thus, a total of $(4 \cdot 16)/(4 \cdot 4) = 4$ multiplications per sample are performed.

Figure 6:
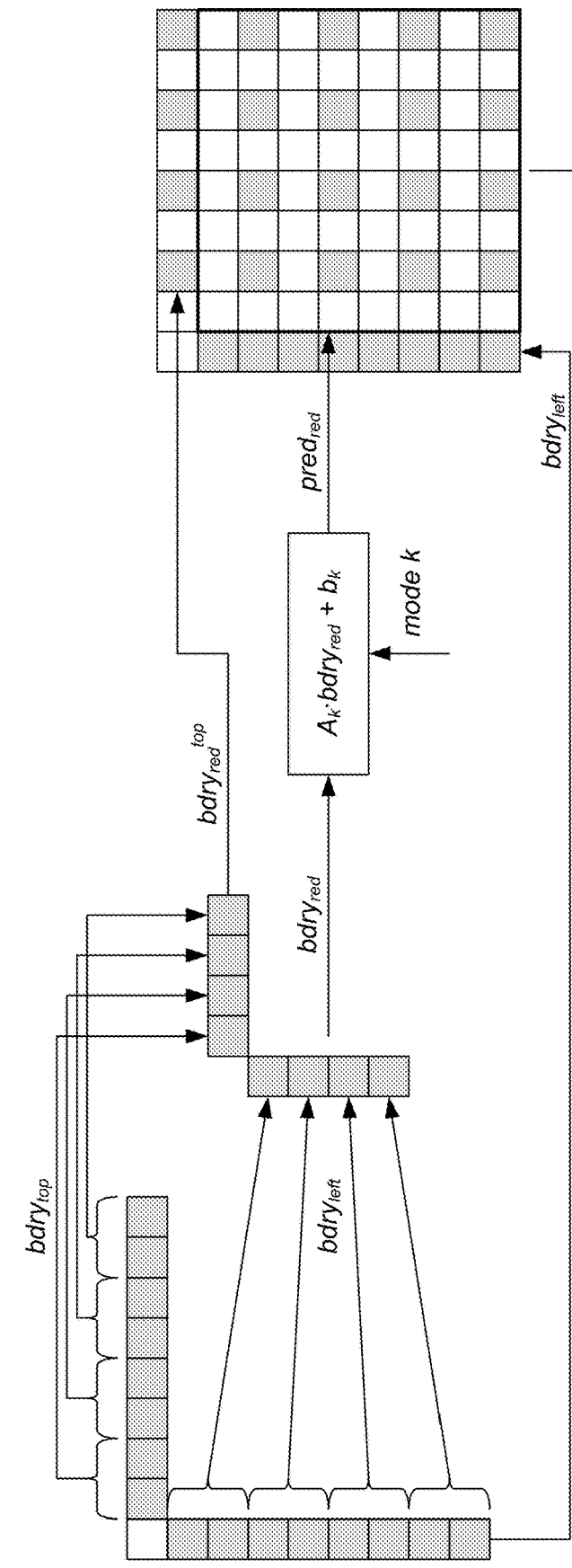
FIG. 6 is a flow diagram illustrating matrix intra prediction mode for 8×8 block.
Figure 6:
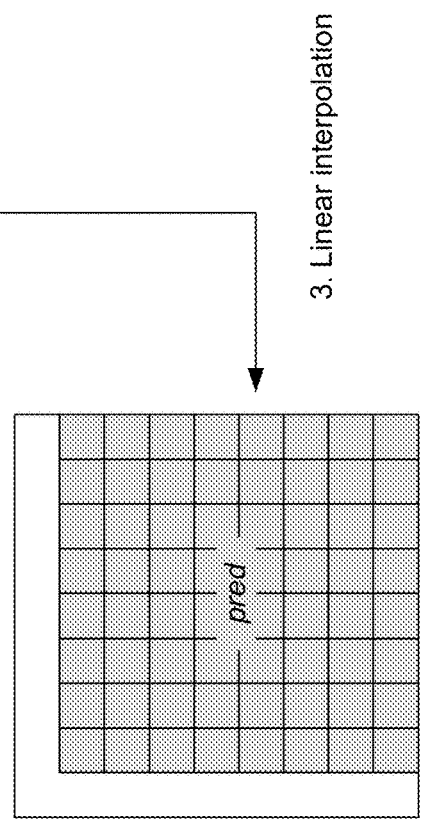

FIG. 6 is a flow diagram illustrating matrix intra prediction mode for 8×8 block. Given an 8×8 block, ALWIP takes four averages along each axis of the boundary. The resulting eight input samples enter the matrix vector multiplication. The matrices are taken from the set $S_1$. This yields 16 samples on the odd positions of the prediction block. Thus, a total of (8·16)/(8·8)=2 multiplications per sample are performed. After adding an offset, these samples are interpolated vertically by using the reduced top boundary. Horizontal interpolation follows by using the original left boundary. The interpolation process does not require any multiplications in this case. Thus, a total of 2 multiplications per sample is required to calculate ALWIP prediction.

In FIG. 6, video encoder 200 and video decoder 300 may determine boundary values based on averages of sets of two reference samples in a row above the current block and an average of sets of two reference samples in a column to the left of the current block for the current block having size of 8×8. For example, as illustrated in FIG. 6, to determine $bdry_{top}$, video encoder 200 and video decoder 300 may determine average of sets of two samples from the row above the current block, and to determine $bdry_{left}$, video encoder 200 and video decoder 300 may determine average of sets of two samples from the column left of the current block. For example, video encoder 200 and video decoder 300 may determine an average of the first and second sample in the row above the current block, an average of the third and fourth sample in the row above the current block, and so forth. Video encoder 200 and video decoder 300 may perform similar operations for the column left of the current block. Video encoder 200 and video decoder 300 may determine $bdry_{red}$ based on $bdry_{top}$ and $bdry_{left}$. Then, video encoder 200 and video decoder 300 may determine $pred_{red}$ as $A*bdry_{red}+b$. As described above, $pred_{red}$ is an example of intra prediction samples, which are subsampled sets of samples of the prediction block. Video encoder 200 and video decoder 300 may then determine the remaining samples of the prediction block using interpolation as illustrated in FIG. 6. In accordance with one or more examples described in this disclosure, video encoder 200 and video decoder 300 may first perform clipping on the intra prediction samples (e.g., perform clipping on $pred_{red}$), and after clipping the intra prediction samples, generate one or more remaining samples in the prediction block (e.g., by interpolating) based on the clipped intra prediction samples (e.g., based on clipped $pred_{red}$ values).

Figure 7:
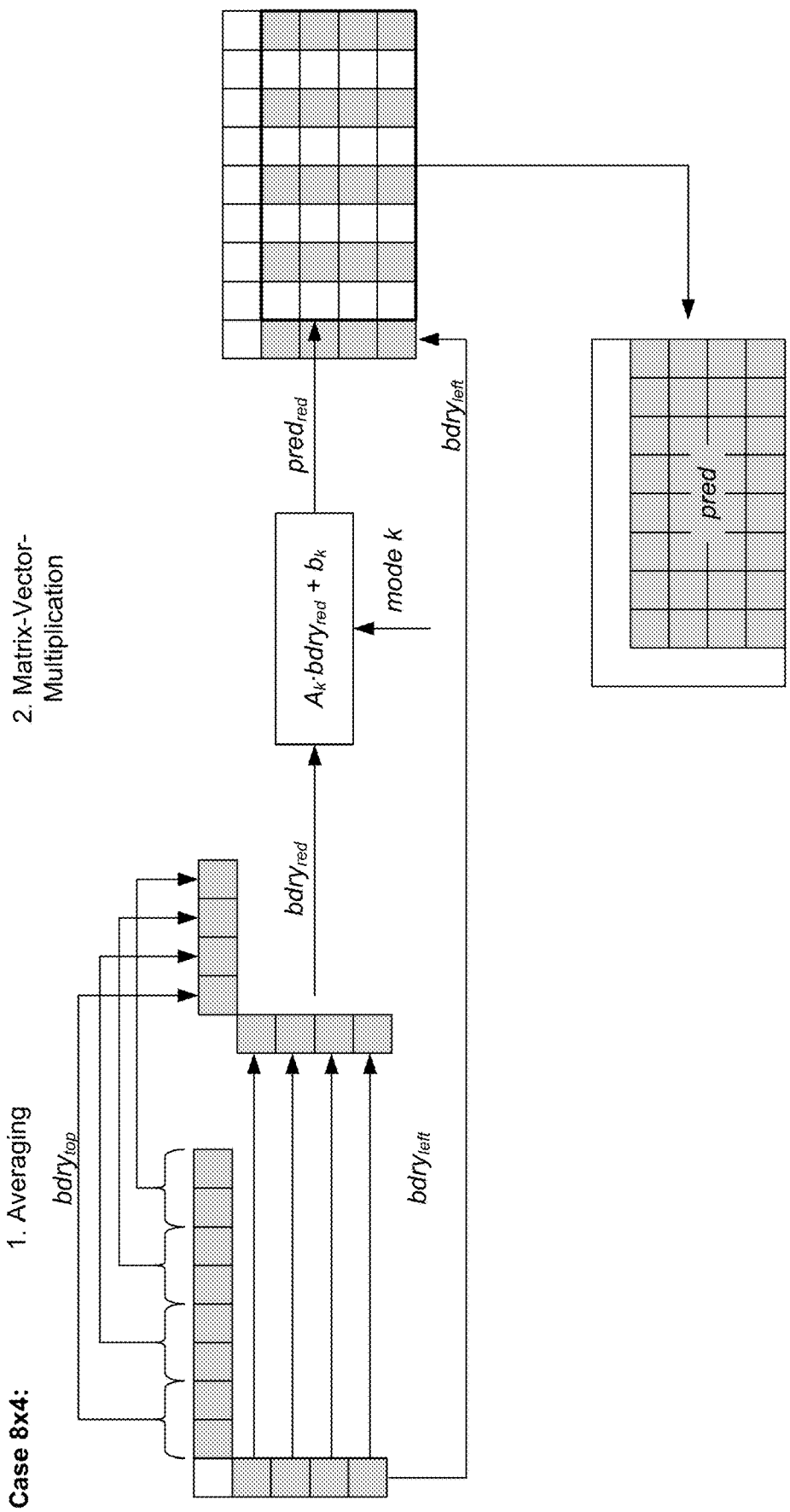
FIG. 7 is a flow diagram illustrating matrix intra prediction mode for 8×4 block.

FIG. 7 is a flow diagram illustrating matrix intra prediction mode for 8×4 block. Given an 8×4 block, ALWIP takes four averages along the horizontal axis of the boundary and the four original boundary values on the left boundary. The resulting eight input samples enter the matrix vector multiplication. The matrices are taken from the set $S_1$. This yields 16 samples on the odd horizontal and each vertical positions of the prediction block. Thus, a total of (8·16)/(8·4)=4 multiplications per sample are performed. After adding an offset, these samples are interpolated horizontally by using the original left boundary. The interpolation process, in this case, does not add any multiplications. Thus, a total of 4 multiplications per sample are required to calculate ALWIP prediction.

In FIG. 7, video encoder 200 and video decoder 300 may determine boundary values based on an average of sets of two reference samples in a row above the current block and reference samples in a column to the left of the current block for current block having size of 8×4. For example, as illustrated in FIG. 7, to determine $bdry_{top}$, video encoder 200 and video decoder 300 may determine average of sets of two samples from the row above the current block, and to determine $bdry_{left}$, video encoder 200 and video decoder 300 may set the samples from the column left of the current block equal to $bdry_{left}$. Video encoder 200 and video decoder 300 may determine $bdry_{red}$ based on $bdry_{top}$ and $bdry_{left}$. Then, video encoder 200 and video decoder 300 may determine $pred_{red}$ as $A*bdry_{red}+b$. As described above, $pred_{red}$ is an example of intra prediction samples, which are subsampled sets of samples of the prediction block. Video encoder 200 and video decoder 300 may then determine the remaining samples of the prediction block using interpolation as illustrated in FIG. 7. In accordance with one or more examples described in this disclosure, video encoder 200 and video decoder 300 may first perform clipping on the intra prediction samples (e.g., perform clipping on $pred_{red}$), and after clipping the intra prediction samples, generate one or more remaining samples in the prediction block (e.g., by interpolating) based on the clipped intra prediction samples (e.g., based on clipped $pred_{red}$ values).

Figure 8:
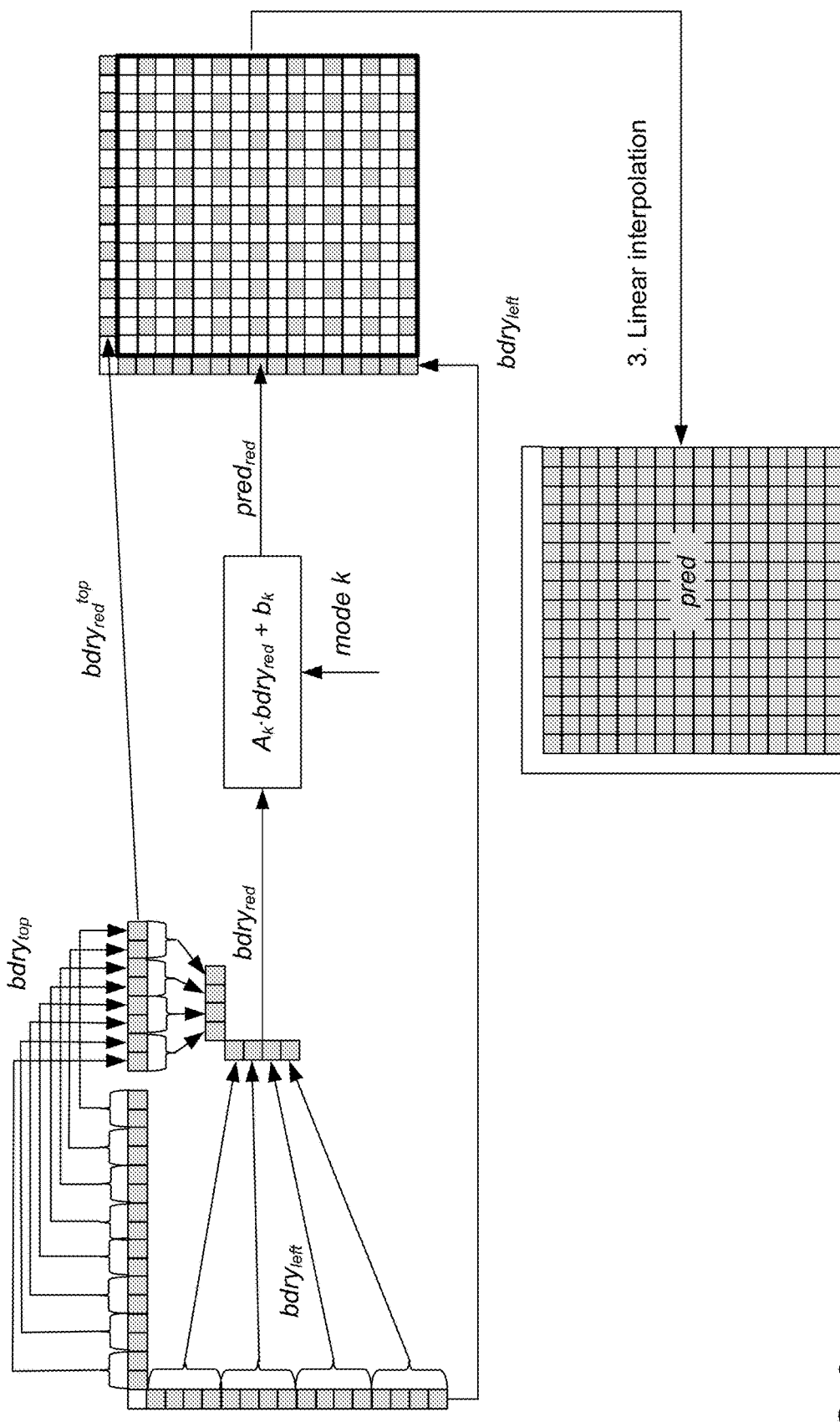
FIG. 8 is a flow diagram illustrating matrix intra prediction mode for 16×16 block.

FIG. 8 is a flow diagram illustrating matrix intra prediction mode for 16×16 block. Given a 16×16 block, ALWIP takes four averages along each axis of the boundary. The resulting eight input samples enter the matrix vector multiplication. The matrices are taken from the set $S_2$. This yields 64 samples on the odd positions of the prediction block. Thus, a total of (8·64)/(16·16)=2 multiplications per sample are performed. After adding an offset, these samples are interpolated vertically by using eight averages of the top boundary. Horizontal interpolation follows by using the original left boundary. The interpolation process, in this case, does not add any multiplications. Therefore, totally, two multiplications per sample are required to calculate ALWIP prediction.

In FIG. 8, video encoder 200 and video decoder 300 may determine boundary values based on an average of sets of two reference samples in a row above the current block to generate eight intermediate samples and an average of sets of two reference samples from the intermediate samples, and an average of set of four reference samples in a column to the left of the current block for the current block having size of 16×16. As one example, video encoder 200 and video decoder 300 may determine an average of the first two samples in the row above the current block to determine a first intermediate value, determine an average of the next two samples in the row above the current block to determine a second intermediate value, and so forth to generate the eight intermediate values. Then, video encoder 200 and video decoder 300 may determine an average of the first two samples of the eight intermediate values to generate a first of the four values that form $bdry_{top}$, determine an average of the next two samples of the eight intermediate values to generate a second of the four values that form $bdry_{top}$, and so forth to generate the four values of $bdry_{top}$. For $bdry_{left}$, video encoder 200 and video decoder 300 may determine an average of the first four samples of the left column to generate a first of the four values that form $bdry_{left}$, determine an average of the next four samples of the left column to generate a second of the four values that form $bdry_{left}$, and so forth.

Video encoder 200 and video decoder 300 may determine $bdry_{red}$ based on $bdry_{top}$ and $bdry_{left}$. Then, video encoder 200 and video decoder 300 may determine $pred_{red}$ as $A*bdry_{red}+b$. As described above, $pred_{red}$ is an example of intra prediction samples, which are subsampled sets of samples of the prediction block. Video encoder 200 and video decoder 300 may then determine the remaining samples of the prediction block using interpolation as illustrated in FIG. 8. In accordance with one or more examples described in this disclosure, video encoder 200 and video decoder 300 may first perform clipping on the intra prediction samples (e.g., perform clipping on $pred_{red}$), and after clipping the intra prediction samples, generate one or more remaining samples in the prediction block (e.g., by interpolating) based on the clipped intra prediction samples (e.g., based on clipped $pred_{red}$ values).

For larger shapes, the procedure may be the same and the number of multiplications per sample may be less than four. For W×8 blocks with W>8, only horizontal interpolation may be necessary as the samples are given at the odd horizontal and each vertical positions. In this case, (8·64)/(W·8)=64/W multiplications per sample are performed to calculate the reduced prediction. For W=16, in this case, no additional multiplications are required for linear interpolation. For W>16, the number of additional multiplications per sample required for linear interpolation is less than two. Thus, total number of multiplications per sample is less than or equal to four.

For W×4 blocks with W>8, let $A_k$ be the matrix that arises by leaving out every row that corresponds to an odd entry along the horizontal axis of the downsampled block. Thus, the output size is 32 and again, only horizontal interpolation remains to be performed. For calculation of reduced prediction, (8·32)/(W·4)=64/W multiplications per sample are performed. For W=16, no additional multiplications are required while, for W>16, less than 2 multiplication per sample are needed for linear interpolation. Thus, the total number of multiplications is less than or equal to four. The transposed cases are treated accordingly.

The following describes single step linear interpolation. For a W×H block with max(W, H)≥8, the prediction signal arises from the reduced prediction signal $pred_{red}$ on $W_{red}$× $H_{red}$ by linear interpolation. Depending on the block shape, linear interpolation is done in vertical, horizontal or both directions. If linear interpolation is to be applied in both directions, linear interpolation is first applied in horizontal direction if W<H and linear interpolation is first applied in vertical direction if W≥H.

As one example, there may be a W×H block with max(W, H)≥8 and W≥H. Then, the one-dimensional linear interpolation is performed as follows for the vertical direction, and the operations for the horizontal direction may be the same. First, the reduced prediction signal is extended to the top by the boundary signal. The following defines the vertical upsampling factor as $U_{ver}=H/H_{red}$ and $U_{ver}=2^{u_{ver}}>1$. Then, the following defines the extended reduced prediction signal by $$pred_{red}[x][-1] = \begin{cases} bdry_{red}^{top}[x] & \text{for } W = 8 \\ bdry_{redII}^{top}[x] & \text{for } W > 8. \end{cases}$$

Then, from this extended reduced prediction signal, the vertically linear interpolated prediction signal is generated by:

$$pred_{red}^{ups,ver}[x][U_{ver} \cdot y + k] =$$
$$\left((U_{ver} - k - 1) \cdot pred_{red}[x][y-1] + (k+1) \cdot pred_{red}[x][y] + \frac{U_{ver}}{2}\right) \gg u_{ver}$$

for $0 \le x < W_{red}$, $0 \le y < H_{red}$ and $0 \le k < U_{ver}$.

As matrix vector multiplication may lead to out-of-range values, an additional clipping stage is added on $pred_{red}^{upds,ver}$ output prediction to guarantee samples in the range of $[0, 2^{bitdepth}-1]$. However, in some examples described in this disclosure, the clipping operation may be performed first on the $pred_{red}$, and then the interpolation may follow, with the interpolation being performed with clipped $pred_{red}$.

The following is a description of a VVC reference sample substitution process. The following is the specification text of the reference sample substitution process as defined in the VVC working draft version 5.

"Inputs to this process are:
a variable refIdx specifying the intra prediction reference line index,
a variable refW specifying the reference samples width,
a variable refH specifying the reference samples height,
reference samples refUnfilt[x][y] with x=-1 refIdx, y=-1-refIdx..refH-1 and x=-refIdx..refW-1, y=-1~refIdx for intra sample prediction,
a variable cIdx specifying the colour component of the current block.

Outputs of this process are the modified reference samples refUnfilt[x][y] with x=-1-refIdx, y=-1-refIdx..refH-1 and x=-refIdx..refW-1, y=-1-refIdx for intra sample prediction.

The variable bitDepth is derived as follows:
If cIdx is equal to 0, bitDepth is set equal to BitDepth$_Y$.
Otherwise, bitDepth is set equal to BitDepth$_C$.

The values of the samples refUnfilt[x][y] with x=-1-refIdx, y=-1-refIdx..refH-1 and x=-refIdx..refW-1, y=-1-refIdx are modified as follows:

If all samples refUnfilt[x][y] with x=-1-refIdx..refH-1 and x=-refIdx..refW-1, y=-1-refIdx are marked as "not available for intra prediction", all values of refUnfilt[x][y] are set equal to 1<<(bitDepth-1).

Otherwise (at least one but not all samples refUnfilt[x][y] are marked as "not available for intra prediction"), the following ordered steps apply:

1. When refUnfilt[-1-refIdx][refH-1] is marked as "not available for intra prediction", search sequentially starting from x=-1-refIdx, y=refH-1 to x=-1-refIdx, y=-1-refIdx, then from x=-refIdx, y=-1-refIdx to x=refW-1, y=-1-refIdx, for a sample refUnfilt[x][y] that is marked as "available for intra prediction". Once a sample refUnfilt[x][y] marked as "available for intra prediction" is found, the search is terminated and the value of refUnfilt[-1-refIdx][refH-1] is set equal to the value of refUnfilt[x][y].

2. For x=-1-refIdx, y=refH-2..-1-refIdx, when refUnfilt[x][y] is marked as "not available for intra prediction", the value of refUnfilt[x][y] is set equal to the value of refUnfilt[x][y+1].

3. For x=0..refW-1, y=-1, when refUnfilt[x][y] is marked as "not available for intra prediction", the value of refUnfilt[x][y] is set equal to the value of refUnfilt[x-1][y].

All samples refUnfilt[x][y] with x=-1-refIdx, y=-1-refIdx..refH-1 and x=-refIdx..refW-1, y=-1-refIdx are marked as "available for intra prediction"."

The following describes VVC DC intra mode. In the VVC working draft version 5, the DC intra mode is specified as follows:

8.4.5.2.10 Specification of INTRA_DC Intra Prediction Mode

Inputs to this process are:
- a variable nTbW specifying the transform block width,
- a variable nTbH specifying the transform block height,
- a variable refIdx specifying the intra prediction reference line index,
- the neighbouring samples p[x][y], with x=−1−refIdx, y=−1−refIdx..nTbH−refIdx−1 and x=−refIdx..nTbW−1−refIdx, y=−1−refIdx.

Outputs of this process are the predicted samples predSamples[x][y], with x=0..nTbW−1, y=0..nTbH−1.

The values of the prediction samples predSamples[x][y], with x=0..nTbW−1, y=0..nTbH−1, are derived by the following ordered steps:

1. A variable dcVal is derived as follows:

When nTbW is equal to nTbH:

$$dcVal=(\Sigma_{x'=0}^{nTbW-1}p[x'-refIdx][-1-refIdx]+ \Sigma_{y'=0}^{nTbH-1}p[-1-refIdx][y'-refIdx]+nTbW)>> (\text{Log } 2(nTbW)+1) \quad (8\text{-}113)$$

When nTbW is greater than nTbH:

$$dcVal=(\Sigma_{x'=0}^{nTbW-1}p[x'-refIdx][-1-refIdx]+ (nTbW>>1))>>\text{Log } 2(nTbW) \quad (8\text{-}114)$$

When nTbW is less than nTbH:

$$dcVal=(\Sigma_{y'=0}^{nTbH-1}p[-1-refIdx][y'-refIdx]+ (nTbH>>1))>>\text{Log } 2(nTbH) \quad (8\text{-}115)$$

2. The prediction samples predSamples[x][y] are derived as follows:

$$predSamples[x][y]=dcVal, \text{ with } x=0..nTbW-1, y=0..nTbH-1 \quad (8\text{-}116)$$

In VVC Draft 5, MIP is specified as follows, with the clipping operation achieved on full resolution prediction:
For the intra sample prediction process according to predModeIntra, the following ordered steps apply:

1. The matrix-based intra prediction samples predMip[x][y], with x=0..mipW−1, y=0..mipH−1 are derived as follows:

The variable modeId is derived as follows:

$$modeId=predModeIntra-(isTransposed?numModes/2:0) \quad (8\text{-}64)$$

The weight matrix mWeight[x][y] with x=0..2*boundarySize−1, y=0..predC*predC−1 is derived using MipSizeId[xTbCmp][yTbCmp] and modeId as specified in Table 8-XX [Ed. (BB): add weight matrices once a non-10-bit weight solution is adopted].

The bias vector vBias[y] with y=0..predC*predC−1 is derived using MipSizeId[xTbCmp][yTbCmp] and modeId as specified in Table 8-XX [Ed. (BB): add bias vectors once a non-10-bit weight solution is adopted].

The variable sW is derived using MipSizeId[xTbCmp][yTbCmp] and modeId as specified in Table 8-8.

The matrix-based intra prediction samples predMip[x][y], with x=0..mipW−1, y=0..mipH−1 are derived as follows:

$$oW=1(sW-1) \quad (8\text{-}65)$$

$$sB=BitDepth_Y-1 \quad (8\text{-}66)$$

$$incW=(predC>mipW)?2:1 \quad (8\text{-}67)$$

$$incH=(predC>mipH)?2:1 \quad (8\text{-}68)$$

$$predMip[x][y]=((\Sigma_{i=0}^{2*boundarySize-1}mWeight[i][y*incH*predC+x*incW]*p[i])+vBias[y*incH*predC+x*incW])<<sB)+oW)>>sW \quad (8\text{-}69)$$

2. When isTransposed is equal to TRUE, the predH× predW array predMip[x][y] with x=0..predH−1, y=0..predW−1 is transposed as follows:

$$predTemp[y][x]=predMip[x][y] \quad (8\text{-}70)$$

$$predMip=predTemp \quad (8\text{-}71)$$

3. The predicted samples predSamples[x][y], with x=0..nTbW−1, y=0..nTbH−1 are derived as follows:

If needUpsBdryVer is equal to TRUE or needUpsBdryHor is equal to TRUE, the MIP prediction upsampling process as specified in clause 8.4.5.2.4 is invoked with the input block width predW, the input block height predH, matrix-based intra prediction samples predMip[x][y] with x=0..predW−1, y=0..predH−1, the transform block width nTbW, the transform block height nTbH, the upsampling boundary width upsBdryW, the upsampling boundary height upsBdryH, the top upsampling boundary samples upsBdryT, and the left upsampling boundary samples upsBdryL as inputs, and the output is the predicted sample array predSamples.

Otherwise, predSamples[x][y], with x=0..nTbW−1, y=0..nTbH−1 is set equal to predMip[x][y].

4. The predicted samples predSamples[x][y] with x=0..nTbW−1, y=0..nTbH−1 are clipped as follows:

$$predSamples[x][y]=Clip1_Y(predSamples[x][y]) \quad (8\text{-}72)$$

TABLE 8-8

Specification of weight shift sW depending on MipSizeId and modeId

| MipSizeId | \multicolumn{18}{c}{modeId} |
|---|---|

| MipSizeId | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 0 | 8 | 8 | 8 | 8 | 8 | 8 | 8 | 8 | 8 | 8 | 8 | 8 | 8 | 8 | 8 | 8 | 8 | 8 |
| 1 | 8 | 8 | 8 | 9 | 8 | 8 | 8 | 8 | 9 | 8 | | | | | | | | |
| 2 | 8 | 8 | 8 | 8 | 8 | 8 | | | | | | | | | | | | |

There may be certain problems with the techniques for the ALWIP process (also called MIP or matrix intra prediction). MIP takes nonoverlapping averages of samples along each axis of the boundary as described above for averaging of the boundary. For example, 2, 4, 8, or 16 samples are averaged depending on the block dimensions (width, height), as also illustrated in FIGS. 5-8. The resulting averaged samples are grouped into a vector of size 4 or 8, depending on the block dimensions, that is multiplied with a matrix and an offset vector is added.

Figure 9:
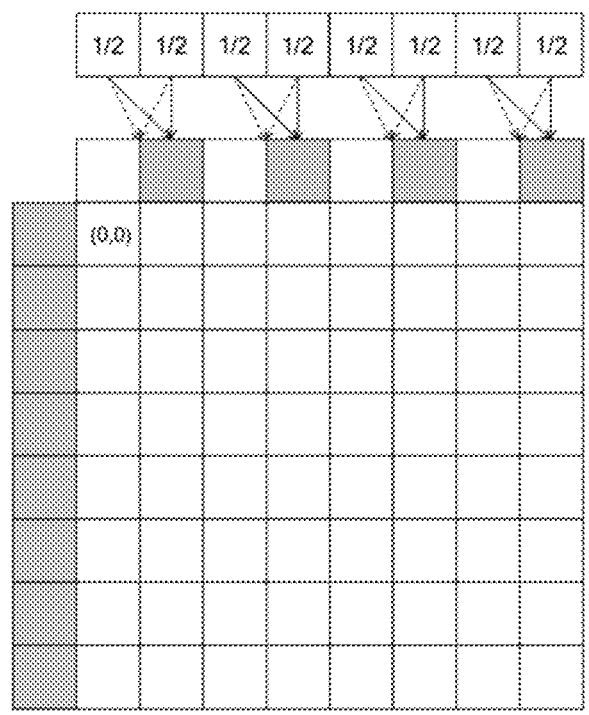
FIG. 9 is a conceptual diagram illustrating matrix intra prediction mode averaging of boundary samples and positioning for 8×8 block.

As illustrated in FIG. 6 and FIG. 9, for an 8×8 block the averaged samples are positioned on the odd locations along the top boundary (greyed samples in FIG. 9). FIG. 9 is a conceptual diagram illustrating matrix intra prediction mode averaging of boundary samples and positioning for an 8×8 block. However, the mathematically exact location of the samples after averaging two samples is at half position locations as illustrated with striped arrows in FIG. 9. The predicted samples are also placed on the odd positions inside the predicted block (greyed samples) as illustrated in FIG. 6 followed first by vertical linear interpolation and then by horizontal linear interpolation. The positioning of the averaged samples on the odd positions along the top boundary is aligned with the positioning of the predicted samples for vertical interpolation.

However, due to the misalignment of the averaged samples along the top boundary, an error is introduced, which can only be partially compensated by training of the matrices and offset vectors. Similar misalignments of averaged boundary samples are observed for other block sizes such as 16×16 in FIG. 8.

This disclosure describes example techniques to reducing the alignment error, which may improve the coding efficiency of the MIP tool in two ways: (1) The training of the matrices and offset vectors does not need to compensate for the misaligned positioning of the predicted samples in the prediction block. For example, this may be helpful for the 8×4 block case (FIG. 7) and other block sizes that do not require interpolation along the vertical and/or horizontal directions. (2) In case interpolation is performed along the vertical or horizontal direction, the correct alignment of the boundary samples with the predicted samples further reduces the error that otherwise needs to be compensated by the training of the matrices and offset vectors.

There may be other possible issues with the ALWIP process (also called MIP or matrix intra prediction). To restate from above, MIP takes nonoverlapping averages of samples along each axis of the boundary as described above for averaging of the boundary. For example, 2, 4, 8, or 16 samples are averaged depending on the block dimensions (width, height), as also illustrated in FIGS. 5-8. The resulting averaged samples are grouped into a vector of size 4 or 8, depending on the block dimensions, that is multiplied with a matrix and an offset vector is added.

The result of these prediction operations is a block of predicted samples that may require further upsampling or interpolation to match the dimensions of the block that is being predicted. The problem is that the prediction operation described in the above MIP method also needs to predict the DC component (or average value) of the block that is being predicted. The coding efficiency of the MIP method may be improved if the DC component of the predicted block is predicted separately. At the same time, the number of matrix parameters and offset vector parameters may be reduced as well as the required bit depth to represent those parameters.

As described also described above, MIP involves a clipping operation after the linear interpolation, on the full resolution prediction. This clipping operation is specified for VVC in Equation (8-72). A problem is that this clipping operation introduces additional complexity since the clipping operation is performed on every sample of the prediction block. For example, clipping on every or many samples of the prediction block leads to 1024 clipping operations for a 32×32 coding unit (CU), while the reduced prediction is achieved on 8×8 block size (i.e., the size of $pred_{red}$ is 8×8).

The following describes example ways of generating a prediction block for a current block based on matrix intra prediction (MIP) mode (also Affine linear weighted intra prediction (ALWIP)). The example techniques below may be applied independently, or one or more techniques may be applicable together.

Figure 10:
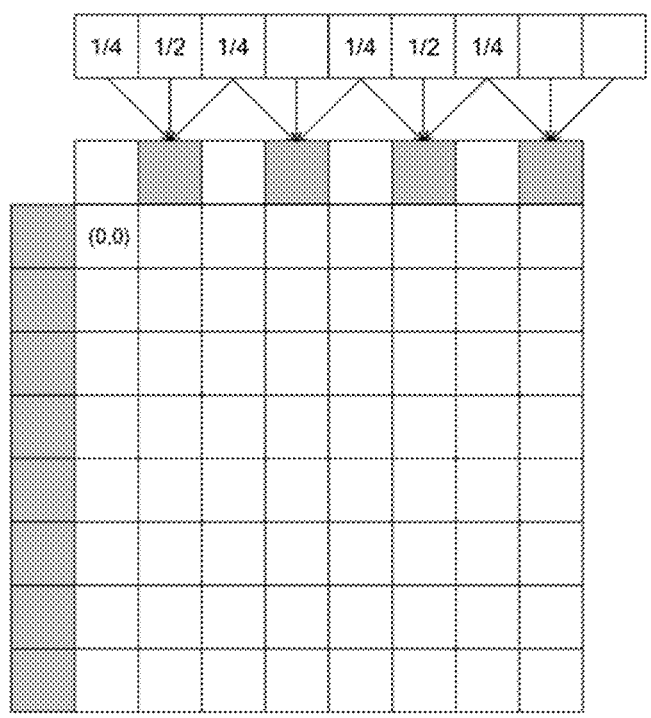
FIG. 10 is a conceptual diagram illustrating filtering of boundary samples with 3-tap filter for two locations.

For alignment, an example of a solution to the stated misalignment problem is for video encoder 200 and video decoder 300 to apply averaging or, more generally, filtering with an odd number of filter taps as illustrated in FIG. 10 for two locations along the top boundary. FIG. 10 is a conceptual diagram illustrating filtering of boundary samples with 3-tap filter for two locations. The samples used in FIG. 10 are above the current block, identified with (0,0) as the top-left corner. The filtering results in the greyed samples in FIG. 10, which are the samples used to generate the prediction block. The same techniques may be used for the left column of neighboring samples. Also, the filter illustrated in FIG. 10 is one example of filter that uses 3-samples. An N-sized filter may be used, where N is an odd number as one example.

In case the filter has an odd number of filter taps and the filter is symmetric around the central filter coefficient, then the correct alignment of the filtered sample may be on an integer position co-located with the central filter coefficient along the top boundary. The example in FIG. 10 applies the [1 2 1]/4 filter to the odd locations along the top boundary. Other examples of filters with different number of filter taps and frequency response characteristics (e.g., cutoff frequency of smoothing or lowpass filter) are: [1, 6, 1]/8; [1, 2, 2, 2, 1]/8; [1, 4, 6, 4, 1]/16; [1, 4, 6, 10, 6, 4, 1,]/32; etc.

Alternatively, an edge-preserving noise-reducing filter such as the bilateral filter may be applied. In another alternative, no downsampling filter is used for the boundary samples (or the one-tap filter [1] is applied) for downsampling to avoid the misalignment of the boundary reference samples (also referred to as subsampling without filtering). Techniques applicable to the top boundary may also apply to the left boundary, or any other boundary of the block, when the boundary reference samples are downsampled.

The filtering and downsampling techniques described in this disclosure may be applied to the boundaries in a similar manner as the averaging that is applied in the MIP method, such as based on the above description for averaging of the boundary. The more samples that are averaged in the MIP method, the wider the filter that video encoder 200 and video decoder 300 apply will be. In one example, the number of filter taps may be close to the number of samples that are averaged.

The proposed filtering and downsampling may be applied to the top boundary, the left boundary, or both boundaries. The boundaries may be generated with the process described above in the VVC reference sample substitution process (VVC WD5 method). The selected boundary may depend on the block dimensions, such as width, height, maximum or minimum of width and height, the ratio of width and height, etc. The selected boundary may also depend on the prediction mode (MIP mode, etc.), etc. The selected boundary may also be signaled in parameter sets, slice header, tile group header, coding unit header, other unit headers, etc.

The filter from a set of filters that video encoder 200 and video decoder 300 apply to the boundaries may depend on the block dimensions, such as width, height, maximum or minimum of width and height, the ratio of width and height, etc. The filter from the set of filters may also depend on the prediction mode (MIP mode, etc.), etc. The filter (index from set of filters, or coefficients, etc.) can be signaled in parameter sets, slice header, tile group header, coding unit header, other unit headers, etc.

A boundary extension may be utilized to accommodate the filtering of the boundary. For example, in FIG. 10, for the [1, 2, 1]/4 filter, one additional sample is required at the right side of the top boundary. Similarly, if the filter is applied to the left boundary one additional sample is required at the bottom of the left boundary. The additional sample may be a copy of the last sample of the boundary above or to the left of the prediction block. Typically, the boundary samples are reconstructed samples from neighboring blocks. Alternatively, an additional neighboring sample can be added to the top and left boundaries. If the filter is wider, then the extension requires additional samples.

The MIP method may be extended with multiple boundary lines or multiple reference lines. One or multiple reference line indices may be signaled to video decoder 300.

Multiple reference lines may be combined before MIP is applied. For example, video encoder 200 and video decoder 300 may average the lines with identical weights or with weights depending on the reference line index.

In other alternatives, the misalignment due to downsampling is retained and the position of the predicted samples after the matrix multiplication (and added offset) is aligned with the "misaligned downsampled samples." For example, in FIG. 9, the predicted samples are aligned with the sample positions due to averaging (at half sample locations horizontally). The upsampling process is modified so that the predicted samples are all at integer aligned positions. In FIG. 9, the vertical upsampling may be done as currently done, but horizontal upsampling may be used to derive all the samples (integer-sample positioned) in the predicted block.

The following describes MIP DC value prediction, which may address issues described above for predicting the DC component. Neighboring reconstructed samples of the current block to be predicted with MIP may be used to predict the DC value of the current block in addition to the matrix and vector multiplication of the averaged reference samples as described above for the averaging of the boundary and the generation of the reduced prediction signal by matrix vector multiplication as follows:

$$\text{pred}_{red} = A \cdot \text{bdry}_{red} + b + DC$$

Or without offset vector b:

$$\text{pred}_{red} = A \cdot \text{bdry}_{red} + DC$$

The vector of reduced boundary samples $\text{bdry}_{red}$ may be obtained according to the above description for averaging of the boundary. The vector may also be used in the MIP prediction after subtracting the DC value as follows:

$$\text{bdry}_{red} = \text{bdry}_{red} - DC$$

The DC value may be computed using the VVC method described above with respect to VVC DC intra mode. The VVC method is also described in U.S. Patent Publication No. 2018/0199062. The benefit of the method is that a division operation is avoided and replaced by a right-shift operation in case both the width and height dimensions of the block are powers of two. In this method (e.g., techniques described in this disclosure), the computation of the DC value is dependent on the width and height dimensions of the block to be predicted.

In case the block is square, the neighboring reconstructed samples on the left of the block and the neighboring reconstructed samples above the block are averaged (in total width+height number of samples are averaged). In case width is larger than height, the neighboring samples above the block are averaged (in total width number of samples are averaged). In case the height is larger than the width, the neighboring samples on the left of the block are averaged to compute the DC value (in total height number of samples are averaged). Typically, the neighboring reconstructed samples directly adjacent to the block are used in the computation. Additionally or alternatively, the reconstructed samples of lines that are located some distance (offset) from the current block may be employed in the computation of the DC value.

Additionally or alternatively, the neighboring reconstructed samples along the width and height dimensions of the block are used in the computation of the DC value. One example is to separately average the neighboring samples on the left of the block and the neighboring samples above the block as follows: DC=[average(left neigh. samples)+average(above neigh. samples)+1]>>1. Additionally or alternatively, other methods to compute the DC value that are described in U.S. Patent Publication No. 2018/0199062 may be used together with MIP.

The benefit of computing the DC value based on the neighboring reconstructed samples before the derivation of the vector of reduced boundary samples $\text{bdry}_{red}$ is that both can be computed simultaneously. For example, the neighboring samples are read only once to obtain both the DC value and the reduced boundary samples.

This technique implies the following changes in the VVC Draft 5. Text inserted into VVC Draft 5 is denoted by <ins> . . . </ins> tags and text deleted from VVC Draft 5 is denoted by <dlt>.. </dlt>.

For the generation of the input values p[x] with x=0..inSize-1, the following applies:

<ins> The DC value of the top reference sample is computed as follows:

$$\text{dcValTop} = ((\Sigma_{i=0}^{nTbW-1} \text{refT}[i]) + (1 << (\text{Log } 2(nTbW) - 1))) >> \text{Log } 2(nTbW)$$

The DC value of the left reference sample is computed as follows:

$$\text{dcValLeft} = ((\Sigma_{i=0}^{nTbH-1} \text{refL}[i]) + (1 << (\text{Log } 2(nTbH) - 1))) >> \text{Log } 2(nTbH)$$

The DC value of the left reference sample is computed as follows:

$$\text{dcVal} = (\text{dcValLeft} + \text{dcValTop} + 1) >> 1</ins>$$

The MIP boundary downsampling process as specified in clause 8.4.5.2.3 is invoked for the top reference samples with the block size nTbW, the reference samples refT[x] with x=0..nTbW-1, and the boundary size boundarySize as inputs, and reduced boundary samples redT[x] with x=0..boundarySize-1 as outputs.

The MIP boundary downsampling process as specified in clause 8.4.5.2.3 is invoked for the left reference samples with the block size nTbH, the reference samples refL[y] with y=0..nTbH-1, and the boundary size boundary Size as inputs, and reduced boundary samples redL[x] with x=0..boundarySize-1 as outputs.

The reduced top and left boundary samples redT and redL are assigned to the boundary sample array pTemp[x] with x=0..2*boundarySize-1 as follows:

If isTransposed is equal to 1, pTemp[x] is set equal to redL[x] with x=0..boundarySize-1 and pTemp[x+boundarySize] is set equal to redT[x] with x=0..boundarySize-1.

Otherwise, pTemp[x] is set equal to redT[x] with x=0..boundarySize-1 and pTemp[x+boundarySize] is set equal to redL[x] with x=0..boundarySize-1.

The input values p[x] with x=0..inSize-1 are derived as follows:

<dlt>$\text{dcVal} = ((\Sigma_{i=0}^{2*boundarySize-1} p\text{Temp}[i]) + \text{boundarySize}) >> \text{Log } 2(2*\text{boundarySize})$ (8-xx)</dlt>

If MipSizeId[xTbCmp][yTbCmp] is equal to 2, the following applies:

$$p[x] = p\text{Temp}[x+1] - \text{dcVal} \quad (8\text{-xx})$$

Otherwise (MipSizeId[xTbCmp][yTbCmp] is less than 2), the following applies:

$$p[0] = \text{dcVal} - (1 << (\text{BitDepth}_Y - 1))$$

$$p[x] = p\text{Temp}[x] - \text{dcVal} \text{ for } x=1..\text{inSize}-1$$

Figure 11:
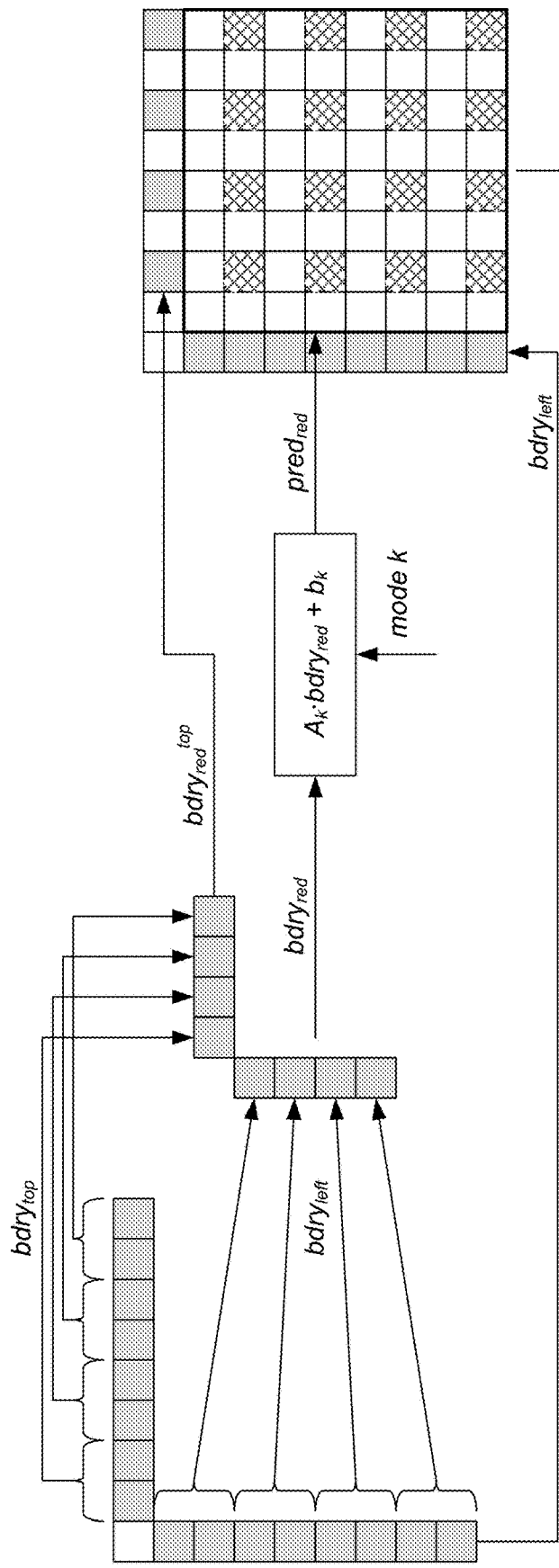
FIG. 11 is a conceptual diagram illustrating an example clipping area and a Matrix Intra Prediction (MIP) clipping area for an 8×8 coding unit example.

In accordance with one or more examples described in this disclosure, to reduce MIP clipping complexity, this disclosure describes shifting the clipping operation prior to the linear interpolation process. One advantage of shifting the clipping operation prior to the interpolation process is limiting the number of clipping operations to the reduced prediction size. The benefit of such example techniques may be seen in FIG. 11 where the proposed clipping area (represented in boxes with dashed outlines and crosshatched fill) is compared to the MIP clipping area of VVC Draft 5 (represented in the box with a dashed outline and no crosshatched fill). Thus, as shown in the example of FIG. 11, the clipping technique of this disclosure may result in application of fewer clipping operations.

For examples, video encoder 200 and video decoder 300 may determine that a current block is to be predicted or is predicted using matrix intra prediction (MIP). Video encoder 200 and video decoder 300 may generate a prediction block for the current block, utilizing the examples techniques described in this disclosure. For example, video encoder 200 and video decoder 300 may determine intra prediction samples based on reference samples for the current block, the intra prediction samples being a sub-sampled set of samples of the prediction block. In other words, video encoder 200 and video decoder 300 may determine intra prediction samples ($pred_{red}$) based on reference samples (e.g., left neighboring and above neighboring samples). As described, $pred_{red}$ are some of the samples of the prediction block.

To determine intra prediction samples ($pred_{red}$), video encoder 200 and video decoder 300 may determine boundary values (e.g., $bdry_{red}$) based on sets of reference samples for the current block. As illustrated and described above with respect to FIGS. 5-8, the boundary values may be equal to the reference samples or averages of sets of the reference samples.

For example, as illustrated in FIG. 6, video encoder 200 and video decoder 300 may determine boundary values ($bdry_{red}$) based on an average of sets of two reference samples in a row above the current block and an average of sets of two reference samples in a column to the left of the current block for current block having size of 8×8. As illustrated in FIG. 7, video encoder 200 and video decoder 300 may determine boundary values ($bdry_{red}$) based on an average of sets of two reference samples in a row above the current block and reference samples in a column to the left of the current block for current block having size of 8×4. As illustrated in FIG. 8, video encoder 200 and video decoder 300 may determine boundary values ($bdry_{red}$) based on an average of sets of two reference samples in a row above the current block to generate eight intermediate samples and an average of sets of two reference samples from the intermediate samples, and an average of set of four reference samples in a column to the left of the current block for the current block having size of 16×16.

Video encoder 200 and video decoder 300 may perform a matrix multiplication on the boundary values to generate first matrix-based intra prediction samples. For instance, video encoder 200 and video decoder 300 may multiply $bdry_{red}$ by matrix A to generate the first matrix-based intra prediction samples. Video encoder 200 and video decoder 300 may apply an offset to the first matrix-based intra prediction samples values to generate second matrix-based intra prediction samples. For example, video encoder 200 and video decoder 300 may add the offset "b" to the result of A*$bdry_{red}$ to generate the second matrix-based intra prediction samples. The intra prediction samples (e.g., $pred_{red}$) may be the second matrix-based intra prediction samples, such that the intra prediction samples being the subsampled set of the samples of the prediction block include the second matrix-based intra prediction samples being the subsampled set of samples in the prediction block.

In accordance with one or more examples described in this disclosure, video encoder 200 and video decoder 300 may clip the intra prediction samples to generate clipped intra prediction samples. Video encoder 200 and video decoder 300 may, after clipping the intra prediction samples, generate one or more remaining samples in the prediction block based on the clipped intra prediction samples (e.g., by interpolation). In this way, video encoder 200 and video decoder 300 generate a prediction block for the current block for MIP.

In one or more examples, by clipping the intra prediction samples before generating remaining samples, the linear interpolation may not produce out-of-range samples or produce fewer out-of-range samples as compared to examples where clipping is performed subsequent to interpolation. Accordingly, the example techniques reduce MIP clipping problem, such as by reducing complexity (e.g., reducing the number of samples on which the clipping operation is performed). From a specification point of view, the clipping achieved in Equation (8-72) is now applied to the predMip[x][y] computed in Equation (8-69). It results in the following changes to VVC Draft 5. As before, text inserted into VVC Draft 5 is denoted by <ins> . . . </ins>tags and text deleted from VVC Draft 5 is denoted by <dlt>..</dlt>.

For the intra sample prediction process according to predModeIntra, the following ordered steps apply:

1. The matrix-based intra prediction samples predMip[x][y], with x=0..mipW−1, y=0..mipH−1 are derived as follows: The variable modeId is derived as follows:

$$modeId=predModeIntra-(isTransposed?numModes/2:0) \quad (8\text{-}64)$$

The weight matrix mWeight[x][y] with x=0..2*boundarySize−1, y=0..predC*predC−1 is derived using MipSizeId[xTbCmp][yTbCmp] and modeId as specified in Table 8-XX [Ed. (BB): add weight matrices once a non-10-bit weight solution is adopted].

The bias vector vBias[y] with y=0..predC*predC−1 is derived using MipSizeId[xTbCmp][yTbCmp] and modeId as specified in Table 8-XX [Ed. (BB): add bias vectors once a non-10-bit weight solution is adopted].

The variable sW is derived using MipSizeId[xTbCmp][yTbCmp] and modeId as specified in Table 8-8.

The matrix-based intra prediction samples predMip[x][y], with x=0..mipW−1, y=0..mipH−1 are derived as follows:

$$oW=1(sW-1) \quad (8\text{-}65)$$

$$sB=BitDepth_Y-1 \quad (8\text{-}66)$$

$$incW=(predC>mipW)?2:1 \quad (8\text{-}67)$$

$$incH=(predC>mipH)?2:1 \quad (8\text{-}68)$$

$$predMip[x][y]=(\Sigma_{i=}^{2*boundarySize-1}mWeight[i][y*incH*predC+x*incW]*p[i])+(vBias[y*incH*predC+x*incW]<<sB)+oW)>>sW \quad (8\text{-}69)$$

<ins>
2. The matrix-based intra prediction samples predMip[x][y] are clipped as follows:

predMip[x][y]=Clip1$_Y$(predMip[x][y])</ins>

3. When isTransposed is equal to TRUE, the predH×predW array predMip[x][y] with x=0..predH−1, y=0..predW−1 is transposed as follows:

$$predTemp[y][x]=predMip[x][y] \quad (8\text{-}70)$$

$$predMip=predTemp \quad (8\text{-}71)$$

4. The predicted samples predSamples[x][y], with x=0..nTbW−1, y=0..nTbH−1 are derived as follows:
   If needUpsBdryVer is equal to TRUE or needUpsBdryHor is equal to TRUE, the MIP prediction upsampling process as specified in clause 8.4.5.2.4 is invoked with the input block width predW, the input block height predH, matrix-based intra prediction samples predMip [x][y] with x=0..predW−1, y=0..predH−1, the transform block width nTbW, the transform block height nTbH, the upsampling boundary width upsBdryW, the upsampling boundary height upsBdryH, the top upsampling boundary samples upsBdryT, and the left upsampling boundary samples upsBdryL as inputs, and the output is the predicted sample array predSamples.
   Otherwise, predSamples[x][y], with x=0..nTbW−1, y=0..nTbH−1 is set equal to predMip[x][y].
<dlt>
5. The predicted samples predSamples[x][y] with x=0..nTbW−1, y=0..nTbH−1 are clipped as follows:

$$predSamples[x][y]=Clip1_Y(predSamples[x][y])</dlt>$$

Figure 3:
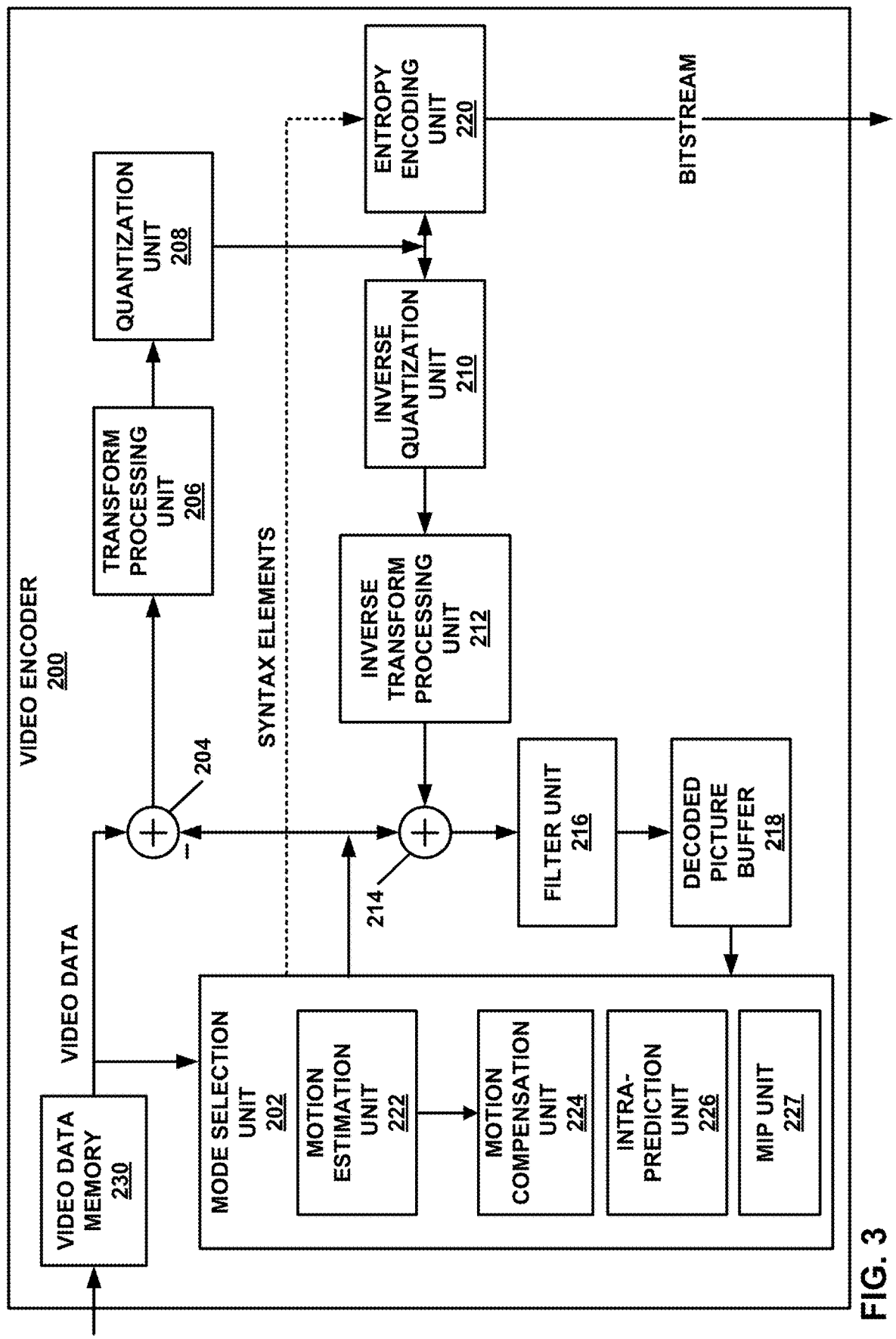
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the H.265/HEVC video coding standard and the H.266/VVC video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. In the example of FIG. 3, mode selection unit 202 also includes MIP unit 227. MIP unit 227 may be part of intra-prediction unit 226 but is shown as a separate unit for ease of illustration. MIP unit 227, in combination with one or more other units of video encoder 200, may be configured to perform the example techniques described in this disclosure.

Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, intra-prediction unit 226, and MIP unit 227) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

MIP unit 227 may be configured to generate a prediction block for the current block, such as for the current block being predicted using matrix intra prediction (MIP). For example, to generate the prediction block for the current block, MIP unit 227 may be configured to determine intra prediction samples based on reference samples for the current block, the intra prediction samples being a subsampled set of samples of the prediction block, clip the intra prediction samples, and after clipping the intra prediction samples, generate one or more remaining samples in the prediction block based on the clipped intra prediction samples. The prediction block may include the clipped intra prediction samples and the one or more remaining samples. The reference samples for the current block may include reference samples in a column left of the current block and reference samples in a row above the current block.

To determine the intra prediction samples, MIP unit 227 may be configured to determine boundary values based on sets of the reference samples for the current block. The boundary values may be equal to the reference samples or averages of sets of the reference samples. MIP unit 227 may perform a matrix multiplication on the boundary values to generate first matrix-based intra prediction samples and apply an offset to the first matrix-based intra prediction samples values to generate second matrix-based intra prediction samples. The intra prediction samples may be the second matrix-based intra prediction samples, and the intra prediction samples being the subsampled set of the samples of the prediction block may include the second matrix-based intra prediction samples being the subsampled set of samples in the prediction block.

To clip the intra prediction samples, MIP unit 227 may clip the second matrix-based intra prediction samples. Also, after clipping the intra prediction samples, to generate the one or more remaining samples in the prediction block based on the clipped intra prediction samples, MIP unit 227 may generate the one or more remaining samples in the prediction block based on the clipped second matrix-based intra prediction samples.

There may be various ways in which MIP unit 227 may determine boundary values based on sets of the reference samples for the current block. As one example, as illustrated in FIG. 6, MIP unit 227 may determine boundary values based on an average of sets of two reference samples in a row above the current block and an average of sets of two reference samples in a column to the left of the current block for current block having size of 8×8. As illustrated in FIG. 7, MIP unit 227 may determine boundary values based on an average of sets of two reference samples in a row above the current block and reference samples in a column to the left of the current block for current block having size of 8×4. As illustrated in FIG. 8, MIP unit 227 may determine boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. That is, residual generation unit 204 may determine residual values indicative of a difference between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream. In this way, entropy encoding unit 220 may signal information indicative of the residual values (e.g., residual values generated by residual generation unit 204).

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to generate a prediction block for a current block based on matrix intra prediction mode in accordance with any one or combination of the techniques described in this disclosure and encode the current block based on the prediction block (e.g., determine residual values based on a difference between the prediction block and the current block). Video encoder 200 may also signal values indicative of the residual values.

Figure 4:
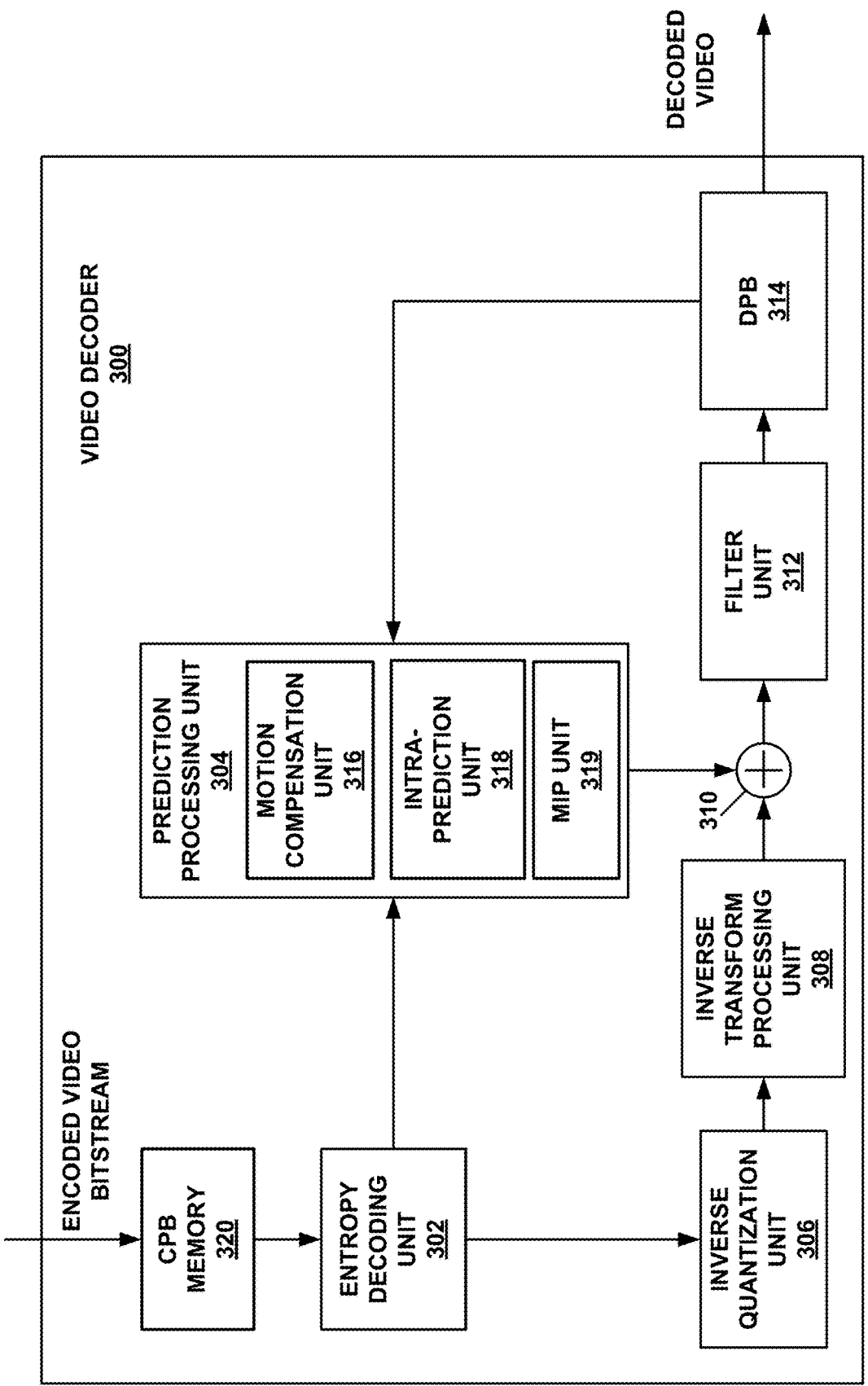
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of VVC and H.264/HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. In the example of FIG. 4, prediction processing unit 304 also includes MIP unit 319. MIP unit 319 may be part of intra-prediction unit 318 but is shown as a separate unit for ease of illustration. MIP unit 319, in combination with one or more other units of video decoder 300, may be configured to perform the example techniques described in this disclosure.

Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

As another example, prediction processing unit 304 may determine that the current block is predicted using matrix intra prediction (MIP). In response to determining that the current block is predicted using MIP, MIP unit 319 may be configured to perform the example techniques described in this disclosure.

MIP unit 319 may be configured to generate a prediction block for the current block, such as for the current block that is predicted using matrix intra prediction (MIP). For example, to generate the prediction block for the current block, MIP unit 319 may be configured to determine intra prediction samples based on reference samples for the current block, the intra prediction samples being a subsampled set of samples of the prediction block, clip the intra prediction samples, and after clipping the intra prediction samples, generate one or more remaining samples in the prediction block based on the clipped intra prediction samples. The prediction block may include the clipped intra prediction samples and the one or more remaining samples. The reference samples for the current block may include reference samples in a column left of the current block and reference samples in a row above the current block.

To determine the intra prediction samples, MIP unit 319 may be configured to determine boundary values based on sets of the reference samples for the current block. The boundary values may be equal to the reference samples or averages of sets of the reference samples. MIP unit 319 may perform a matrix multiplication on the boundary values to generate first matrix-based intra prediction samples and apply an offset to the first matrix-based intra prediction samples values to generate second matrix-based intra prediction samples. The intra prediction samples may be the second matrix-based intra prediction samples, and the intra prediction samples being the subsampled set of the samples of the prediction block may include the second matrix-based intra prediction samples being the subsampled set of samples in the prediction block.

To clip the intra prediction samples, MIP unit 319 may clip the second matrix-based intra prediction samples. Also, after clipping the intra prediction samples, to generate the one or more remaining samples in the prediction block based on the clipped intra prediction samples, MIP unit 319 may, after clipping the intra prediction samples, generate the one or more remaining samples in the prediction block based on the clipped second matrix-based intra prediction samples.

There may be various ways in which MIP unit 319 may determine boundary values based on sets of the reference samples for the current block. As one example, as illustrated in FIG. 6, MIP unit 319 may determine boundary values based on an average of sets of two reference samples in a row above the current block and an average of sets of two reference samples in a column to the left of the current block for current block having size of 8×8. As illustrated in FIG. 7, MIP unit 319 may determine boundary values based on an average of sets of two reference samples in a row above the current block and reference samples in a column to the left of the current block for current block having size of 8×4. As illustrated in FIG. 8, MIP unit 319 may determine boundary values based on an average of sets of two reference samples in a row above the current block to generate eight intermediate samples and an average of sets of two reference samples from the intermediate samples, and on an average of a set of four reference samples in a column to the left of the current block for a current block having size of 16×16.

Reconstruction unit 310 may reconstruct the current block using the prediction block and the residual block (e.g., reconstruct the current block based on the prediction block and residual values indicative of a difference between the prediction block and the current block). For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to generate a prediction block for a current block based on matrix intra prediction mode in accordance with any one or combination of the techniques described in this disclosure and decode the current block based on the prediction block (e.g., receive values indicative of residual values from an encoded bitstream and reconstruct the current block based on the prediction block and the residual values).

Figure 12:
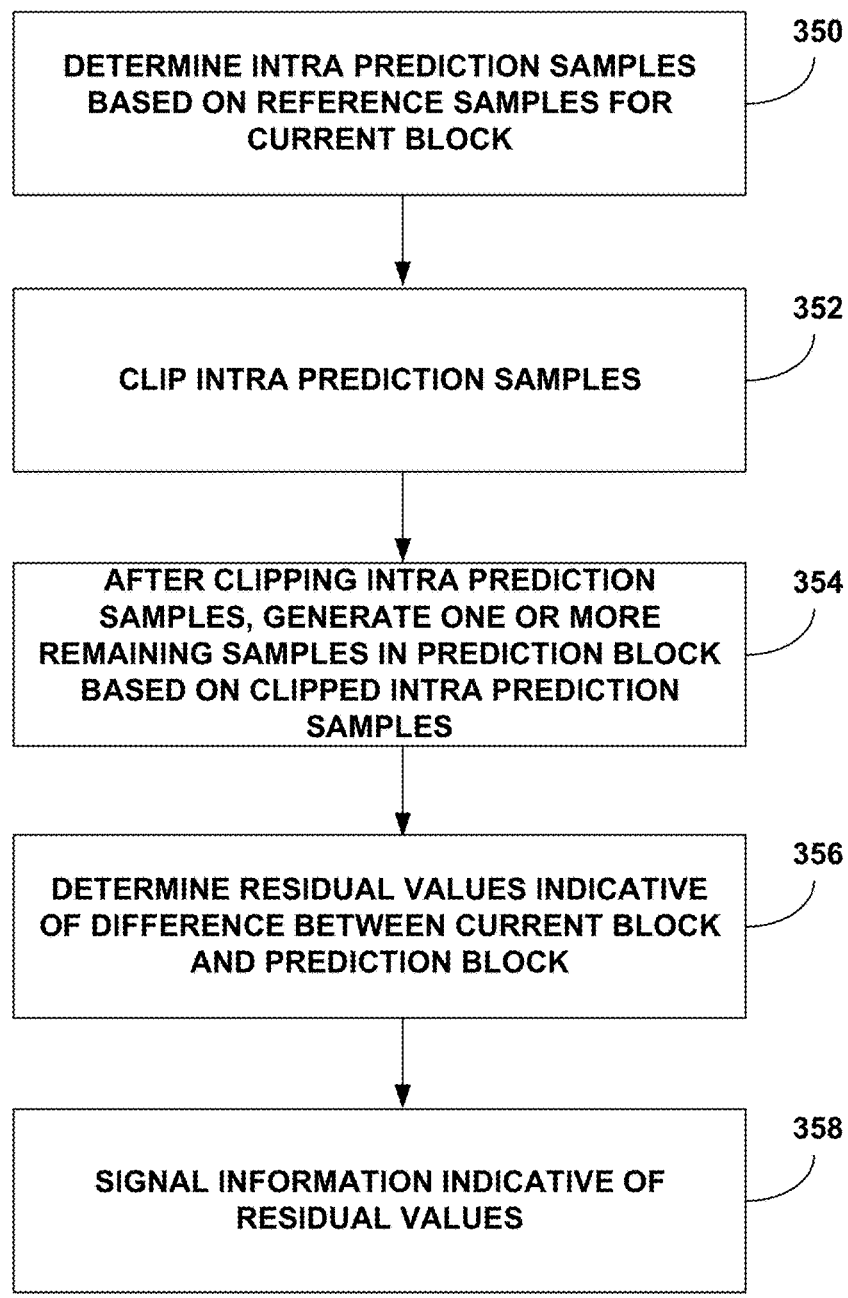
FIG. 12 is a flowchart illustrating an example of encoding video data.

FIG. 12 is a flowchart illustrating an example method for encoding a current block. The current block may comprise a current CU. Although described with respect to video encoder 200 (FIGS. 1 and 3), it should be understood that other devices may be configured to perform a method similar to that of FIG. 12. For example, FIG. 12 is described with respect to MIP unit 227 of video encoder 200, which is one example of processing circuitry configured to perform example techniques described in this disclosure.

A memory (e.g., video data memory 230, decoded picture buffer 218, or some other memory) may be configured to store reference samples for the current block. Examples of the reference samples include reference samples in a column left of the current block and reference samples in a row above the current block.

The example of FIG. 12 may be for the current block being predicted using matrix intra prediction (MIP). MIP unit 227 may be configured to generate a prediction block for a current block according to the example of FIG. 12 for the current block being predicted using MIP.

For example, MIP unit 227 may determine intra prediction samples (e.g., $pred_{red}$) based on reference samples for the current block, the intra prediction samples being a subsampled set of samples of the prediction block (350). The following describes example techniques to determine the intra prediction samples (e.g., $pred_{red}$).

MIP unit 227 may determine boundary values (e.g., $bdry_{red}$) based on sets of the reference samples for the current block. The boundary values (e.g., $bdry_{red}$) may be equal to the reference samples or averages of sets of the reference samples. MIP unit 227 may perform a matrix multiplication on the boundary values to generate first matrix-based intra prediction samples (e.g., perform $A*bdry_{red}$, where A is a matrix to generate the first matrix-based intra prediction samples). MIP unit 227 may apply an offset to the first matrix-based intra prediction samples values to generate second matrix-based intra prediction samples (e.g., MIP unit 227 may apply offset "b" to the first matrix-based intra prediction samples to determine $A*bdry_{red}+b$, which is the second matrix-based intra prediction samples). In one or more examples, the intra prediction samples (e.g., $pred_{red}$) are the second matrix-based intra prediction samples.

The following describes example techniques for MIP unit 227 to determine the boundary values (e.g., $bdry_{red}$). As one example, MIP unit 227 may determine boundary values based on an average of sets of two reference samples in a row above the current block and an average of sets of two reference samples in a column to the left of the current block for current block having size of 8×8. As one example, MIP unit 227 may determine boundary values based on an average of sets of two reference samples in a row above the current block and reference samples in a column to the left of the current block for current block having size of 8×4. As one example, MIP unit 227 may determine boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

MIP unit 227 may clip the intra prediction samples (352). For example, MIP unit 227 may perform clipping operation defined as Clip1. One example of the equation for the clipping operation (e.g., Clip1) is Clip1(x)=Clip3(0, (1<<BitDepth)−1, x), where x is the intra prediction samples (e.g., each one of $pred_{red}$ sample values). As described above, the second matrix-based intra prediction samples may be the intra predication samples (e.g., $pred_{red}$). In some examples, clipping the intra prediction samples may include clipping the second matrix-based intra prediction samples.

After clipping the intra prediction samples, MIP unit 227 may generate one or more remaining samples in the prediction block based on the clipped intra prediction samples (354). For example, after clipping the intra prediction samples, generating the one or more remaining samples in the prediction block based on the clipped intra prediction samples may include after clipping the intra prediction samples, and generating the one or more remaining samples in the prediction block based on the clipped second matrix-based intra prediction samples. One example way to generate the one or more remaining samples is with interpolation (e.g., linear interpolation). The clipped intra prediction samples and the one or more remaining samples may together form the prediction block.

Residual generation unit 204 may determine residual values indicative of a difference between the current block and the prediction block (356). Entropy encoding unit 220 may signal information indicative of the residual values (358), e.g., for use by a video decoder.

Figure 13:
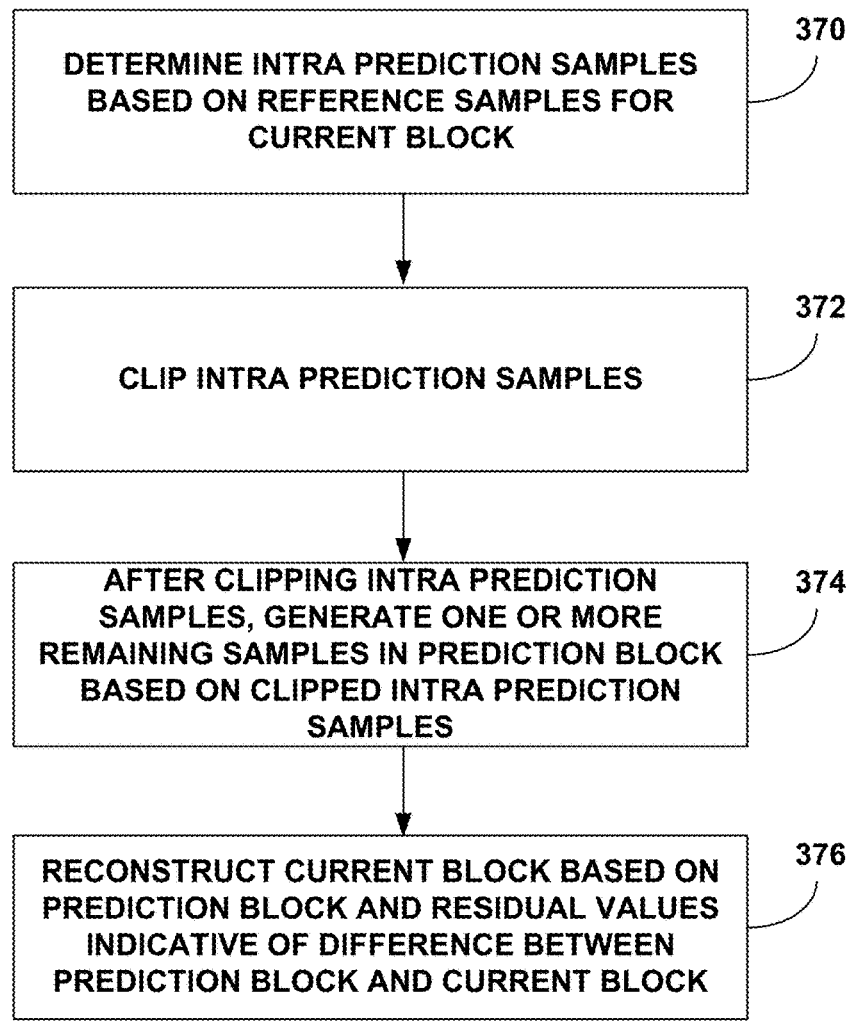
FIG. 13 is a flowchart illustrating an example of decoding video data.

FIG. 13 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 13. For example, FIG. 13 is described with respect to MIP unit 319 of video decoder 300, which is one example of processing circuitry configured to perform example techniques described in this disclosure.

A memory (e.g., decoded picture buffer 314 or some other memory) may be configured to store reference samples for the current block. Examples of the reference samples include reference samples in a column left of the current block and reference samples in a row above the current block.

In the example of FIG. 13, prediction processing unit 304 may determine that the current block is predicted using matrix intra prediction (MIP). MIP unit 319 may be configured to generate a prediction block for a current block according to the example of FIG. 13 in response to determining that the current block is predicted using MIP.

For example, MIP unit 319 may determine intra prediction samples (e.g., $pred_{red}$) based on reference samples for the current block (370). The intra prediction samples may be a subsampled set of samples of the prediction block. The following describes example techniques to determine the intra prediction samples (e.g., $pred_{red}$).

MIP unit 319 may determine boundary values (e.g., $bdry_{red}$) based on sets of the reference samples for the current block. The boundary values (e.g., $bdry_{red}$) may be equal to the reference samples or averages of sets of the reference samples. MIP unit 319 may perform a matrix multiplication on the boundary values to generate first matrix-based intra prediction samples (e.g., perform $A*bdry_{red}$, where A is a matrix to generate the first matrix-based intra prediction samples). MIP unit 319 may apply an offset to the first matrix-based intra prediction samples values to generate second matrix-based intra prediction samples (e.g., MIP unit 319 may apply offset "b" to the first matrix-based intra prediction samples to determine $A*bdry_{red}+b$, which is the second matrix-based intra prediction samples). In one or more examples, the intra prediction samples (e.g., $pred_{red}$) are the second matrix-based intra prediction samples.

The following describes example techniques for MIP unit 319 to determine the boundary values (e.g., $bdry_{red}$). As one example, MIP unit 319 may determine boundary values based on an average of sets of two reference samples in a row above the current block and an average of sets of two reference samples in a column to the left of the current block for current block having size of 8×8. As one example, MIP unit 319 may determine boundary values based on an average of sets of two reference samples in a row above the current block and reference samples in a column to the left of the current block for current block having size of 8×4. As one example, MIP unit 319 may determine boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

MIP unit 319 may clip the intra prediction samples (372). For example, MIP unit 319 may perform clipping operation defined as Clip1. One example of the equation for the clipping operation (e.g., Clip1) is Clip1(x)=Clip3(0, (1<<BitDepth)−1, x), where x is the intra prediction samples (e.g., each one of $pred_{red}$ sample values). As described above, the second matrix-based intra prediction samples may be the intra prediction samples (e.g., $pred_{red}$). In some examples, clipping the intra prediction samples may include clipping the second matrix-based intra prediction samples.

After clipping the intra prediction samples, MIP unit 319 may generate one or more remaining samples in the prediction block based on the clipped intra prediction samples (374). For example, after clipping the intra prediction samples, generating the one or more remaining samples in the prediction block based on the clipped intra prediction samples may include generating the one or more remaining samples in the prediction block based on the clipped second matrix-based intra prediction samples. One example way to generate the one or more remaining samples is with interpolation (e.g., linear interpolation). The clipped intra prediction samples and the one or more remaining samples may together form the prediction block.

Reconstruction unit 310 may reconstruct the current block based on the prediction block and residual values indicative of difference between the prediction block and the current block (376). For example, reconstruction unit 310 may add the residual values to the prediction block to reconstruct the current block and store the current block in DPB 314 for reference or later display. In some examples, filter unit 312 may performing filtering prior storage in DPB 314.

The following are example techniques that may be utilized alone or in combination.

Example 1

A method of coding video data, the method comprising generating a prediction block for a current block based on a matrix intra prediction mode in accordance with any one or combination of the techniques described in this disclosure and coding the current block based on the prediction block.

Example 2

The method of example 1, further comprising receiving values indicative of residual values, from an encoded bitstream, wherein the residual values are based on a difference between the prediction block and the current block, wherein coding the current block comprises decoding the current block, and wherein decoding the current block comprises reconstructing the current block based on the prediction block and the residual values.

Example 3

The method of example 1, wherein coding the current block comprises encoding the current block, and wherein encoding the current block comprises determining residual values based on a difference between the prediction block and the current block, the method further comprising signaling values indicative of the residual values.

Example 4

The method of any of examples 1-3, wherein generating the prediction block comprises applying a filter having an odd number of filter taps to neighboring samples of the current block to generated filtered samples and generating the prediction block based on the filtered samples.

Example 5

The method of any of examples 1-3, wherein generating the prediction block comprises applying an edge-preserving noise-reducing filter to neighboring samples of the current block to generate filtered samples and generating the prediction block based on the filtered samples.

Example 6

The method of any of examples 1-3, wherein generating the prediction block comprises performing sub-sampling without filtering of neighboring samples of the current block to generated sub-sampled samples and generating the prediction block based on the sub-sampled samples.

Example 7

The method of any of examples 4-6, wherein the neighboring samples comprise one or more of neighboring samples above the current block and neighboring samples left of the current block.

Example 8

The method of example 7, further comprising determining to apply the filter or perform sub-sampling without filtering to one or both of the neighboring samples above the current block and neighboring samples left of the current block based on one or more of block dimensions of the current block, prediction mode, or information that is signaled.

Example 9

The method of any of examples 4-8, further comprising selecting a type of filter to apply or a manner in which to perform sub-sampling without filtering based on one or more of block dimensions of the current block, prediction mode, or information that is signaled.

Example 10

The method of any of examples 4-8, further comprising determining whether applying the filter or performing sub-sampling without filtering requires access to a sample that is right of the current block or below the current block and generating a sample value for the sample that is above-right of the current block or below the current block, wherein applying the filter or performing sub-sampling without filtering comprises applying the filter or performing sub-sampling without filtering with the generated sample value.

Example 11

The method of any of examples 1-10, wherein generating a prediction block for a current block based on matrix intra prediction mode comprises determining a DC value for the current block based on neighboring reconstructed samples.

Example 12

The method of example 11, wherein determining the DC value for the current block based on neighboring reconstructed samples comprises determining the DC value for the current block based on neighboring reconstructed samples before or in parallel with determining boundary reference samples.

Example 13

The method of any of examples 11 and 12, further comprising determining both the DC value and reduced boundary reference sample values based on retrieving from memory, only once, neighboring sample values for the current block.

Example 14

The method of any of examples 1-13, wherein generating the prediction block comprises determining boundary values based on reference samples for the current block, wherein the boundary values are equal to the reference samples or averages of sets of the reference samples, performing a matrix multiplication on the boundary values to generate first matrix-based intra prediction samples, applying an offset to the first matrix-based intra prediction samples values to generate second matrix-based intra prediction samples, the second matrix-based intra prediction samples being a subsampled set of samples in the prediction block, clipping the second matrix-based intra prediction samples, and after clipping the second matrix-based intra prediction samples, interpolating remaining samples in the prediction block based on the clipped second matrix-based intra prediction samples.

Example 15

A device for coding video data, the device comprising a memory configured to store the video data and a video coder comprising at least one of fixed-function or programmable circuitry, wherein the video coder is configured to perform the method of any of examples 1-14.

Example 16

The device of example 15, further comprising a display configured to display decoded video data.

Example 17

The device of example 15 or 16, wherein the device comprises one or more of a camera, a computer, a mobile device, a broadcast receiver device, or a set-top box.

Example 18

A computer-readable storage medium having stored thereon instructions that, when executed, cause one or more processors to perform the method of any of examples 1-14.

Example 19

A device for coding video data, the device comprising means for preforming the method of any of examples 1-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   generating a prediction block for a current block, wherein generating the prediction block for the current block comprises:
      determining intra prediction samples based on reference samples for the current block, the intra prediction samples being a subsampled set of samples of the prediction block, wherein determining the intra prediction samples based on the reference samples comprises:
         determining a DC offset based on the reference samples and a width and a height of the current block;
         determining boundary values based on sets of the reference samples for the current block and the DC offset;
         performing a matrix multiplication on the boundary values to generate first matrix-based intra prediction samples; and
         applying an offset to the first matrix-based intra prediction samples values to generate the intra prediction samples;
      generating one or more remaining samples in the prediction block based on the intra prediction samples; and
   reconstructing samples of the current block based on the prediction block and residual values indicative of a difference between the prediction block and the current block.

2. The method of claim 1, further comprising:
   clipping the intra prediction samples, and
   wherein generating the one or more remaining samples in the prediction block based on the intra prediction samples comprises after clipping the intra predictions samples, generating the one or more remaining samples in the prediction block based on the clipped intra prediction samples.

3. The method of claim 1, wherein determining the boundary values based on sets of the reference samples for the current block and the DC offset comprises one of:
   determining boundary values based on an average of sets of two reference samples in a row above the current block and an average of sets of two reference samples in a column to the left of the current block for current block having size of 8×8;
   determining boundary values based on an average of sets of two reference samples in a row above the current block and reference samples in a column to the left of the current block for current block having size of 8×4; or
   determining boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

4. The method of claim 1, further comprising:
   determining that the current block is predicted using matrix intra prediction (MIP),
   wherein determining intra prediction samples based on reference samples for the current block, and generating the one or more remaining samples in the prediction block based on the intra prediction samples comprises, in response to determining that the current block is predicted using MIP, determining intra prediction samples based on reference samples for the current block, and generating the one or more remaining samples in the prediction block based on the intra prediction samples.

5. The method of claim 1, wherein the reference samples for the current block comprise reference samples in a column left of the current block and reference samples in a row above the current block.

6. A method of encoding video data, the method comprising:
  generating a prediction block for a current block, wherein generating the prediction block for the current block comprises:
    determining intra prediction samples based on reference samples for the current block, the intra prediction samples being a subsampled set of samples of the prediction block, wherein determining the intra prediction samples based on the reference samples comprises:
      determining a DC offset based on the reference samples and a width and a height of the current block;
      determining boundary values based on sets of the reference samples for the current block and the DC offset
      performing a matrix multiplication on the boundary values to generate first matrix-based intra prediction samples; and
      applying an offset to the first matrix-based intra prediction samples values to generate the intra prediction samples;
    generating one or more remaining samples in the prediction block based on the clipped intra prediction samples;
  determining residual values indicative of a difference between the current block and the prediction block; and
  signaling information indicative of the residual values.

7. The method of claim 6, further comprising:
  clipping the intra prediction samples, and
  wherein generating the one or more remaining samples in the prediction block based on the intra prediction samples comprises after clipping the intra predictions samples, generating the one or more remaining samples in the prediction block based on the clipped intra prediction samples.

8. The method of claim 6, wherein determining the boundary values based on sets of the reference samples for the current block and the DC offset comprises one of:
  determining boundary values based on an average of sets of two reference samples in a row above the current block and an average of sets of two reference samples in a column to the left of the current block for current block having size of 8×8;
  determining boundary values based on an average of sets of two reference samples in a row above the current block and reference samples in a column to the left of the current block for current block having size of 8×4; or
  determining boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

9. The method of claim 6, wherein:
  determining intra prediction samples based on reference samples for the current block, and generating the one or more remaining samples in the prediction block based on the intra prediction samples comprises, for the current block being predicted using matrix intra prediction (MIP), determining intra prediction samples based on reference samples for the current block, and generating the one or more remaining samples in the prediction block based on the intra prediction samples.

10. The method of claim 6, wherein the reference samples for the current block comprise reference samples in a column left of the current block and reference samples in a row above the current block.

11. The method of claim 1, wherein determining the DC offset based on the reference samples and the width and the height of the current block comprises determining the DC offset based on one of:
  averaging the reference samples above and left of the current block in response to the width of the current block and the height of the current block being the same;
  averaging the reference samples above the current block in response to the width of the current block being greater than the height of the current block; or
  averaging the reference samples left of the current block in response to the height of the current block being greater than the width of the current block.

12. A device for decoding video data, the device comprising:
  a memory configured to store reference samples for a current block; and
  processing circuitry configured to:
    generate a prediction block for the current block, wherein to generate the prediction block for the current block, the processing circuitry is configured to:
      determine intra prediction samples based on the reference samples stored in the memory for the current block, the intra prediction samples being a subsampled set of samples of the prediction block, wherein to determine the intra prediction samples based on the reference samples, the processing circuitry is configured to:
        determine a DC offset based on the reference samples and a width and a height of the current block;
        determine boundary values based on sets of the reference samples for the current block and the DC offset
        perform a matrix multiplication on the boundary values to generate first matrix-based intra prediction samples; and
        apply an offset to the first matrix-based intra prediction samples values to generate the intra prediction samples;
      generate one or more remaining samples in the prediction block based on the intra prediction samples; and
    reconstruct samples of the current block based on the prediction block and residual values indicative of a difference between the prediction block and the current block.

13. The device of claim 12, wherein
  the processing circuitry is configured to clip the intra prediction samples, and
  wherein to generate the one or more remaining samples in the prediction block based on the intra prediction samples, the processing circuitry is configured to, after clipping the intra predictions samples, generate the one or more remaining samples in the prediction block based on the clipped intra prediction samples.

14. The device of claim 12, wherein to determine the boundary values based on sets of the reference samples for the current block and the DC offset, the processing circuity is configured to one of:

determine boundary values based on an average of sets of two reference samples in a row above the current block and an average of sets of two reference samples in a column to the left of the current block for current block having size of 8×8;

determine boundary values based on an average of sets of two reference samples in a row above the current block and reference samples in a column to the left of the current block for current block having size of 8×4; or determine boundary values based on an average of sets of two reference samples in a row above the current block to generate eight intermediate samples and an average of sets of two reference samples from the intermediate samples, and an average of set of four reference samples in a column to the left of the current block for the current block having size of 16×16.

15. The device of claim 12, wherein the processing circuitry is configured to:

determine that the current block is predicted using matrix intra prediction (MIP), wherein to determine intra prediction samples based on reference samples for the current block, and generate the one or more remaining samples in the prediction block based on the intra prediction samples, the processing circuitry is configured to, in response to determining that the current block is predicted using MIP, determine intra prediction samples based on reference samples for the current block, and generate the one or more remaining samples in the prediction block based on the intra prediction samples.

16. The device of claim 12, wherein the reference samples for the current block comprise reference samples in a column left of the current block and reference samples in a row above the current block.

17. The device of claim 12, wherein to determine the DC offset based on the reference samples and the width and the height of the current block, the processing circuitry is configured to determine the DC offset based on one of:

averaging the reference samples above and left of the current block in response to the width of the current block and the height of the current block being the same;

averaging the reference samples above the current block in response to the width of the current block being greater than the height of the current block; or averaging the reference samples left of the current block in response to the height of the current block being greater than the width of the current block.

18. A device for encoding video data, the device comprising:

memory configured to store reference samples for a current block; and processing circuitry configured to:

generate a prediction block for the current block, wherein to generate the prediction block for the current block, the processing circuitry is configured to:

determine intra prediction samples based on reference samples for the current block, the intra prediction samples being a subsampled set of samples of the prediction block, wherein to determine the intra prediction samples based on the reference samples, the processing circuitry is configured to:

determine a DC offset based on the reference samples and a width and a height of the current block;

determine boundary values based on sets of the reference samples for the current block and the DC offset;

perform a matrix multiplication on the boundary values to generate first matrix-based intra prediction samples; and apply an offset to the first matrix-based intra prediction samples values to generate the intra prediction samples;

generate one or more remaining samples in the prediction block based on the intra prediction samples;

determine residual values indicative of a difference between the current block and the prediction block; and signal information indicative of the residual values.

19. A device for decoding video data, the device comprising:

means for generating a prediction block for a current block, wherein the means for generating the prediction block for the current block comprises:

means for determining intra prediction samples based on reference samples for the current block, the intra prediction samples being a subsampled set of samples of the prediction block, wherein the means for determining the intra prediction samples based on the reference samples comprises:

means for determining a DC offset based on the reference samples and a width and a height of the current block;

means for determining boundary values based on sets of the reference samples for the current block and the DC offset;

means for performing a matrix multiplication on the boundary values to generate first matrix-based intra prediction samples; and means for applying an offset to the first matrix-based intra prediction samples values to generate the intra prediction samples;

means for generating one or more remaining samples in the prediction block based on the intra prediction samples; and means for reconstructing samples of the current block based on the prediction block and residual values indicative of a difference between the prediction block and the current block.

20. The device of claim 19, further comprising:

means for clipping the intra prediction samples, and wherein the means for generating the one or more remaining samples in the prediction block based on the intra prediction samples comprises means for generating the one or more remaining samples in the prediction block based on the clipped intra prediction samples after clipping the intra prediction samples.

21. A non-transitory computer-readable storage medium storing instructions thereon that when executed cause one or more processors of a device for decoding video data to:

generate a prediction block for a current block, wherein the instructions that cause the one or more processors to generate the prediction block for the current block comprise instructions that cause the one or more processors to:

determine intra prediction samples based on reference samples for the current block, the intra prediction samples being a subsampled set of samples of the prediction block, wherein the instructions that cause the one or more processors to determine the intra prediction samples based on the reference samples comprise instructions that cause the one or more processors to:
- determine a DC offset based on the reference samples and a width and a height of the current block;
- determine boundary values based on sets of the reference samples for the current block and the DC offset;
- perform a matrix multiplication on the boundary values to generate first matrix-based intra prediction samples; and
- apply an offset to the first matrix-based intra prediction samples values to generate the intra prediction samples;

generate one or more remaining samples in the prediction block based on the intra prediction samples; and reconstruct samples of the current block based on the prediction block and residual values indicative of a difference between the prediction block and the current block.

22. The non-transitory computer-readable storage medium of claim 21, further comprising
- instructions that cause the one or more processors to clip the intra prediction samples, and
- wherein the instructions that cause the one or more processors to generate the one or more remaining samples in the prediction block based on the intra prediction samples comprise instructions that cause the one or more processors to, after clipping the intra predictions samples, generate the one or more remaining samples in the prediction block based on the clipped intra prediction samples.

* * * * *